(12) United States Patent
Weitkemper et al.

(10) Patent No.: US 8,462,893 B2
(45) Date of Patent: Jun. 11, 2013

(54) RECEIVER AND METHOD FOR DECODING A RECEIVE SIGNAL IN A WIRELESS COMMUNICATION SYSTEM

(75) Inventors: Petra Weitkemper, Germering (DE); Guido Dietl, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 14 days.

(21) Appl. No.: 13/222,780

(22) Filed: Aug. 31, 2011

(65) Prior Publication Data

US 2012/0051468 A1 Mar. 1, 2012

(30) Foreign Application Priority Data

Sep. 1, 2010 (EP) .................................... 10174928

(51) Int. Cl.
*H03D 1/00* (2006.01)
*H04L 27/06* (2006.01)
(52) U.S. Cl.
USPC .......................................... 375/340; 714/780
(58) Field of Classification Search
USPC ................... 375/262, 340–341; 714/780, 794
See application file for complete search history.

(56) References Cited

U.S. PATENT DOCUMENTS 6,161,209 A * 12/2000 Moher ........................... 714/780
2010/0125764 A1* 5/2010 Kose ............................. 714/704

OTHER PUBLICATIONS

Extended European Search Report for European Application No. 10174928.1, dated May 9, 2011, 9 pages.
Abou-Faycal Ibrahim et al., "Optimal Uncoded Regeneration for Binary Antipodal Signaling," IEEE Communications Society, 2004, pp. 742-746.
Bao, Xingkai et al., "Efficient Message Relaying for Wireless User Cooperation: Decode-Amplify-Forward (DAF) and Hybrid DAF and Coded-Cooperation," IEEE Transactions on Wireless Communications, vol. 6, No. 11, Nov. 2007, pp. 3975-3984.
Cui, Tao et al., "Memoryless Relay Strategies for Two-Way Relay Channels," IEEE Transactions on Communications, vol. 57, No. 10, Oct. 2009, pp. 3132-3143.
Gomadam, Krishna Srikanth et al., "On the Capacity of Memoryless Relay Networks," IEEE Communications Society, IEEE ICC 2006 Proceedings, 6 pages.

(Continued)

*Primary Examiner* — Curtis Odom
(74) *Attorney, Agent, or Firm* — Brinks Hofer Gilson & Lione

(57) ABSTRACT

The receiver includes a signal determiner, a soft information determiner and a soft information decoder. The signal determiner determines a complex receive value for the receive signal received from a relay station. Further, the soft information determiner obtains a soft information represented by a combination of a first probability value and a second probability value. The first probability value is derivable by adding a value depending on an overall probability density function for each symbol of a modulation alphabet including a same first bit value at a same bit position of the symbols, wherein each symbol of the modulation alphabet represents at least two bits. Further, the overall probability density function indicates a probability of receiving the complex receive value, if a signal representing the respective symbol s considered for adding was transmitted from a transmitter to a relay station, wherein the signal representing the respective symbol causes the receive signal received from the relay station. The second probability value is derivable by adding a value depending on the overall probability density function for each symbol of the modulation alphabet including a same second bit value at the same bit position of the symbols. Further, the soft information decoder decodes payload data contained by the receive signal based on the obtained soft information.

15 Claims, 16 Drawing Sheets

OTHER PUBLICATIONS

Han, Jaemin et al., "Asymmetric diversity modulation scheme in wireless fading relay channels," IEEE Transactions on Wireless Communications, vol. 8, No. 7, Jul. 2009, pp. 3442-3447.

Hoshyar, Reza et al., "Soft Decode and Forward of MQAM Modulations for Cooperative Relay Channels," IEEE, 2008, Centre for Communications Systems Research, Department of Electronic Engineering, University of Surrey, pp. 639-643.

Hu, Jun et al., "Low Density Parity Check Codes over Wireless Relay Channels," IEEE Transactions on Wireless Communications, vol. 6, No. 9, Sep. 2007, pp. 3384-3394.

Pu, Wei et al., "Continuous Network Coding in Wireless Relay Networks," IEEE Communications Society, IEEE INFOCOM 2008 Proceedings, pp. 2198-2206.

Weitkemper, Petra, "Soft Information Relaying for Wireless Networks with Error-Prone Source-Relay Link," University of Bremen, Department of Communications Engineering and University of Rostock, Institute of Communications Engineering, 6 pages.

Yang, Sichao et al., "Network Coding over a Noisy Relay: a Belief Propagation Approach," IEEE 2007, ISIT 2007, Nice, France, Jun. 24-Jun. 29, 2007, pp. 801-804.

* cited by examiner

RECEIVER AND METHOD FOR DECODING A RECEIVE SIGNAL IN A WIRELESS COMMUNICATION SYSTEM

RELATED APPLICATIONS

This application claims priority under 35 U.S.C. §119 to European Patent Application No. 10174928.1 filed on Sep. 1, 2010, the entire content of which is hereby incorporated by reference.

BACKGROUND OF THE INVENTION

Embodiments according to the invention relate to wireless communication systems and particularly to a receiver and a method for decoding a receive signal in a wireless communication system.

One major goal for future wireless communication systems is a uniform user experience. In cellular systems cell-edge users suffer from path loss and interference from neighboring cells and experience a much lower data rate than users in the cell centre. In order to combat this problem, additional relay nodes can be used to support the communication. Up to now mainly two relaying functions are considered, namely Amplify-Forward (AF) and Decode-Forward (DF). DF can either mean a channel decoding at the relay or a hard decision directly on the received signal which will be called DetF here to avoid confusion. The latter case is interesting as the avoidance of computationally complex channel decoding would enable very simple and small relays with low power consumption. But both, AF and DetF have certain drawbacks leading to the idea to find more sophisticated solutions. AF suffers from noise amplification whereas with DetF useful information is lost due to the hard decision. For this purpose a relay function minimizing the mean squared error called Estimate-Forward (EF) has been proposed in the literature combining the benefits of AF and DF. The function for EF is the expectation value of the transmitted symbol and therefore combines the idea of exploiting the discrete alphabet with the aim of preserving reliability information about the first hop. In any case, it is desired to increase the user throughput.

SUMMARY OF THE INVENTION

According to an embodiment, a receiver for decoding a receive signal in a wireless communication system may have: a signal determiner configured to determine a complex receive value for the receive signal; a soft information determiner configured to obtain a soft information represented by a combination of a first probability value and a second probability value, wherein the first probability value is derivable by adding a value depending on an overall probability density function for each symbol of a modulation alphabet comprising a same first bit value at a same bit position of the symbols, wherein each symbol of the modulation alphabet represents at least two bits, wherein the overall probability density function indicates a probability of receiving the complex receive value, if a signal representing the respective symbol considered for adding was transmitted from a transmitter to a relay station, the signal representing the respective symbol causing the receive signal received from the relay station, wherein the second probability value is derivable by adding a value depending on the overall probability density function for each symbol of the modulation alphabet comprising a same second bit value at the same bit position of the symbols, wherein the first bit value and the second bit value are different; a soft information decoder configured to decode payload data contained by the receive signal based on the obtained soft information.

According to another embodiment, a method for decoding a receive signal in a wireless communication system may have the steps of: determining a complex receive value for the receive signal; obtaining a soft information represented by a combination of a first probability value and a second probability value, wherein the first probability value is derivable by adding a value depending on an overall probability density function for each symbol of a modulation alphabet comprising a same first bit value at a same bit position of the symbols, wherein each symbol of the modulation alphabet represents at least two bits, wherein the overall probability density function indicates a probability of receiving the complex receive value, if a signal representing the respective symbol considered for adding was transmitted from a transmitter to a relay station, the signal representing the respective symbol causing the receive signal received from the relay station, wherein the second probability value is derivable by adding a value depending on the overall probability density function for each symbol of the modulation alphabet comprising a same second bit value at the same bit position of the symbols, wherein the first bit value and the second bit value are different; and decoding payload data contained by the receive signal based on the obtained soft information.

Another embodiment may have a computer program with a program code for performing the inventive method, when the computer program runs on a computer or a microcontroller.

An embodiment of the invention provides a receiver for decoding a receive signal in a wireless communication system comprising a signal determiner, a soft information determiner and a soft information decoder. The signal determiner is configured to determine a complex receive value for the receive signal. Further, the soft information determiner is configured to obtain a soft information represented by a combination of a first probability value and a second probability value. The first probability value is derivable by adding a value depending on an overall probability density function for each symbol of a modulation alphabet comprising a same first bit value at a same bit position of the symbols, wherein each symbol of the modulation alphabet represents at least two bits. The overall probability density function indicates a probability of receiving the complex receive value, if a signal representing the respective symbol considered for adding was transmitted from a transmitter to a relay station, the signal representing the respective symbol causing the receive signal received from the relay station. The second probability value is derivable by adding a value depending on the overall probability density function for each symbol of the modulation alphabet comprising a same second bit value at the same bit position of the symbols. The first bit value and the second bit value are different. Further, the soft information decoder is configured to decode payload data contained by the receive signal based on the obtained soft information.

Embodiments according to the present invention are based on the central idea that payload data contained by a receive signal can be decoded based on a soft information indicating a probability whether a bit to be decoded is a logical 0 or a logical 1 for a wireless communication system using a modulation alphabet with at least four different symbols (each symbol represents at least two bits), if the data is sent via a relay station. For this, the behavior of the relay station is considered by the soft information, since the soft information depends on an overall probability density function indicating a probability of receiving the complex receive value, if a signal representing the respective symbol considered for adding was transmitted to the relay station, wherein the signal representing the respective symbol causes the receive signal received from the relay station. In this way, the behavior of the relay station can be considered for complex modulation alphabets more accurate. Therefore, the bit error rate may be reduced and/or the throughput or the mutual information may be increased.

In some embodiments according to the invention, the soft information determiner calculates the first probability value and the second probability value and combines the first and the second probability value to obtain the soft information. In this way, the soft information determiner calculates the soft information in dependence on the determined complex receive value.

Some other embodiments of the invention comprise a storage unit configured to store a lookup table containing a plurality of soft information for a plurality of predefined complex receive values. Further, the soft information determiner determines the soft information for decoding based on the plurality of soft information contained by the lookup table depending on the determined complex receive value. In this case, a plurality of soft information is predetermined for the plurality of predefined complex receive values and the soft information determiner may select one of them or may interpolate between soft information contained by the lookup table to obtain the soft information used by the soft information decoder for decoding.

In some embodiments according to the invention, the soft information represents a logarithmic likelihood ratio.

Some embodiments according to the invention relate to an overall probability density function depending on a relay function known by the receiver. The relay function is used by the relay station to determine a radio signal to be transmitted to the receiver based on a radio signal received from the transmitter. The relay function may be based on a minimum mean square error approach.

BRIEF DESCRIPTION OF THE DRAWINGS

Embodiments of the present invention will be detailed subsequently referring to the appended drawings, in which.

DETAILED DESCRIPTION OF THE PREFERRED EMBODIMENTS

Figure 1:
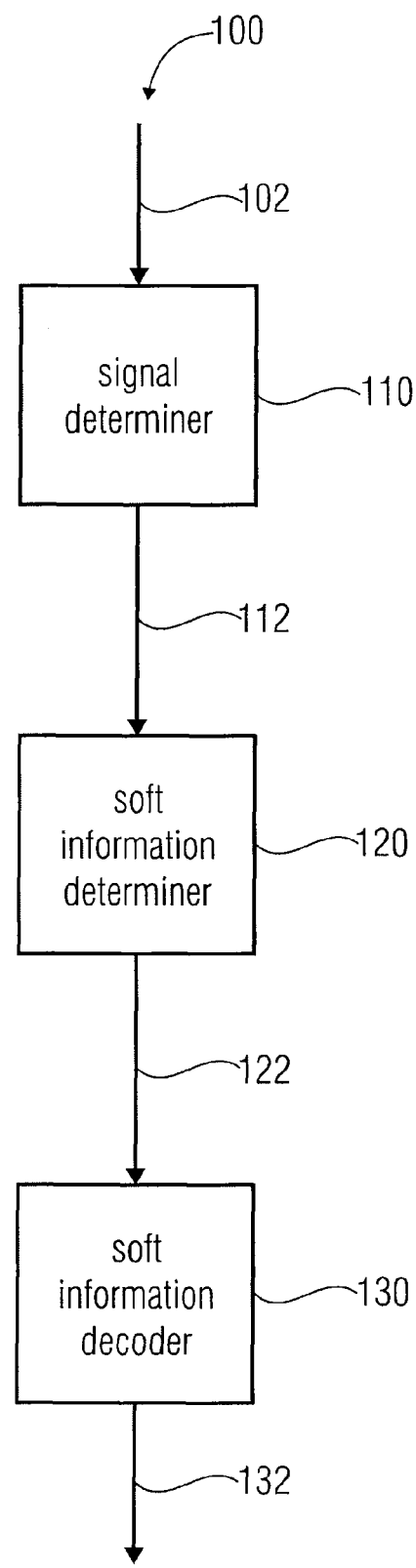
FIG. 1 is a block diagram of a receiver.

In the following, the same reference numerals are partly used for objects and functional units having the same or similar functional properties and the description thereof with regard to a figure shall apply also to other figures in order to reduce redundancy in the description of the embodiments.

Forwarding reliability information in relay networks has attracted much attention in the last years as it combines the advantages of simple linear relaying like Amplify-Forward (AF) and hard decision relaying as Decode-Forward (DF) or Detect-Forward (DetF). In the following, uncoded transmission or coded transmission with a simple relay which does no channel decoding is considered. The latter case is interesting as channel coding is done in nearly all communication systems but in some cases the relay should be kept as simple as possible. Especially mobile relays with battery constraints are a promising approach for future communication systems. Although DetF shows good performance if the source-relay channel is good and AF is reasonable in the other case, both show significant loss in some cases. One possibility is to switch between relay functions depending on the specific scenario or channel conditions. The approach presented combines the advantages of AF and DetF by taking the discrete symbols into account like DetF but still preserving reliability information to be exploited at the receiver as AF, for example. Forwarding Log-Likelihood Ratios (LLR) in the case of BPSK (binary phase shift keying) or QPSK (quadrature phase shift keying), is shown, for example, in "X. Bao and J. Li, "Efficient Message Relaying for Wireless User Cooperation: Decode-Amplify-Forward (DAF) and Hybrid DAF and Coded-Cooperation," IEEE Transaction on Wireless Communications, vol. 6, no. 11, pp. 3975-3984, November 2007" and "S. Yang and R. Kötter, "Network Coding over a Noisy Relay: a Belief Propagation Approach," in IEEE International Symposium on Information Theory, Nice, France, June 2007" or modulating the phase of BPSK symbols according to the reliability, in "W. Pu, C. Luo, S. Li, and C. W. Chen, "Continuous Network Coding in Wireless Relay Networks," in IEEE Conference on Computer Communications, April 2008, pp. 1526-1534". A more systematic approach is to look for an optimal relay function in a certain sense. For an uncoded system the Bit Error Rate (BER) could be an appropriate measure for a metric to be optimized. The resulting BER minimizing function for BPSK was derived in "I. Abou-Faycal and M. Medard, "Optimal uncoded regeneration for binary antipodal signaling," in IEEE International Conference on Communications, Paris, France, June 2004" and extended to two-way relaying in "T. Cui, T. Ho, and J. Kliewer, "Memoryless relay strategies for two-way relay channels," IEEE Transactions on Communications, vol. 57, no. 10, pp. 3132-3143, 2009". Although this approach works well in uncoded two-hop systems, almost all communication systems are channel coded. In this case the uncoded BER is no meaningful measure but instead a relay function minimizing the mean squared error (MSE) was derived in "K. Gomadam and S. A. Jafar, "Optimal Relay Functionality for SNR Maximization in Memoryless Relay Networks," IEEE Journal on Selected Areas in Communications, vol. 25, no. 2, pp. 390-401, February 2007". This function leads to the expectation value of the transmitted symbols also called soft symbols. This approach works for all modulation alphabets and was shown in "On the Capacity of Memoryless Relay Networks," in IEEE International Conference on Communications, Istanbul, Turkey, June 2006" to even maximize capacity at least for BPSK under the constraint of memoryless functions, meaning a symbolwise processing without e.g. channel decoding at the relay.

This MSE minimizing function for memoryless relays called Estimate-Forward (EF) is a powerful approach for uncoded two-hop relaying systems. But if the aim of the relay is not only range extension but diversity and capacity gain, also the direct link between source and destination or even signals from other relays can be taken into account. In the practically interesting case of orthogonal medium access of source and relay, the two signals can be combined properly. Although the distribution needed for calculation of LLRs for the case of BPSK is known "R. Thobaben and E. G. Larsson, "Sensor-network aided cognitive radio: On the optimal receiver for estimate-and-forward protocols applied to the relay channel," in Asilomar Conference on Signals, Systems and Computers, Pacific Grove, USA, November 2007" and "P. Weitkemper, D. Wübben, V. Kühn, and K.-D. Kammeyer, "Soft Information Relaying for Wireless Networks with Error-Prone Source-Relay Link," in 7th International ITG Conference on Source and Channel Coding, January 2008", a general solution for arbitrary signal alphabets is still missing. A suboptimal solution often used is a Gaussian approximation of the signal transmitted by the relay leading to a simple weighted combining of these two received signals. This approach is not optimal due to the non-linearity function of the EF function. In the following, for example, a Maximum-Likelihood detection for EF is derived in a general manner enabling optimal reception by proper combining of the pdfs (probability density functions) to calculate LLR. The gain of EF and especially of the proposed receiver in such a system will be shown via simulations. This scheme can directly be applied to a coded system using a simple, non-decoding relay.

Figure 3:
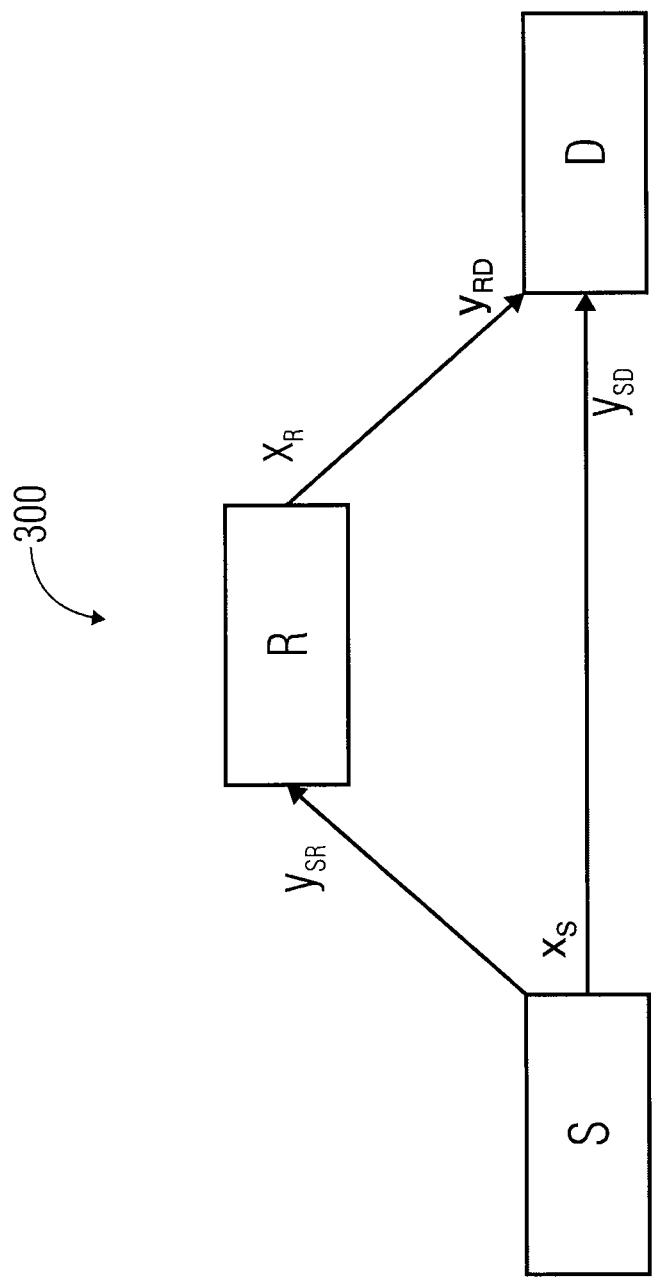
FIG. 3 is a schematic illustration of a system model of a classical three-terminal system.

In a considered system 300 as shown, for example, in FIG. 3, information bits d are possibly channel encoded and interleaved, then mapped to modulation symbols s ∈ A and transmitted with transmit power $P_S$. As the presented scheme can be applied to uplink and downlink, the terminal that wants to transmit a message is called source and can either be a UE (user equipment) or an eNB (evolved node B), and the terminal who wants to receive the message is called destination. The signal transmitted by the source S is $$x_S = \sqrt{P_S} \cdot s \tag{1}$$

and the received signals at the relay R and the destination D (receiver) become $$y_{SR} = h_{SR} \cdot x_S + n_R \tag{2}$$

$$y_{SD} = h_{SD} \cdot x_S + n_D. \tag{3}$$

The noise at the relay R and the destination D has variance $\sigma_R^2$ and $\sigma_D^2$, respectively. The channel coefficients are denoted by $h_{SR}$, $h_{SD}$ and $h_{RD}$ and contain also the path loss. In this report only frequency flat channels are considered, but all derivations are also valid per subcarrier for OFDM systems with frequency selective fading. The destination remembers the received signal $y_{SD}$ for further use and the relay now uses a function $f(y_{SR})$ to calculate the signal to be forwarded to the destination.

$$y_{RD} = h_{RD} \cdot x_R + n_D \tag{4}$$

with $$x_R = \sqrt{P_R} \cdot f(y_{SR}). \tag{5}$$

If Amplify-Forward is applied, the function $f$ equals $$f(y_{SR}) = \beta_{AF} \cdot y_{SR} \tag{6}$$

where $\beta_{AF}$ represents a scaling factor normalizing the average transmit power of the relay $$\beta_{AF} = \frac{1}{\sqrt{E\{|y_{SR}|^2\}}} = \frac{1}{\sqrt{|h_{SR}|^2 P_S + \sigma_R^2}}. \tag{7}$$

In the case of DetF simply a hard decision on the transmitted symbol is applied $$f(y_{SR}) = \hat{s} = \max_{s \in A} p(s \mid y_{SR}). \tag{8}$$

As mentioned before, both approaches are suboptimal and therefore a function minimizing the MSE may be considered. The Mean Squared Error (MSE) for an arbitrary relay function and discrete modulation alphabet A containing the symbols s yields (see for example "K. Gomadam and S. A. Jafar, "Optimal Relay Functionality for SNR Maximization in Memoryless Relay Networks," IEEE Journal on Selected Areas in Communications, vol. 25, no. 2, pp. 390-401, February 2007")

$$MSE = E\{|f(y_{SR}) - s|^2\} \tag{9}$$

and is minimized by $$f(y_{SR}) = \beta E\{s \mid y_{SR}\} = \beta \sum_{s \in A} sp(s \mid y_{SR}). \tag{10}$$

Normalization of equation (10) to the power constraint does not change the MSE minimizing property. The result is very general and valid for arbitrary modulation schemes as BPSK, QPSK, and M-QAM (multi-level quadrature amplitude modulation). In "K. Gomadam and S. A. Jafar, "Optimal Relay Functionality for SNR Maximization in Memoryless Relay Networks," IEEE Journal on Selected Areas in Communications, vol. 25, no. 2, pp. 390-401, February 2007", for more than one relay either a multihop network is formed or several relays transmit simultaneously.

In the following, orthogonal medium access via FDD or TDD is assumed between source (transmitter) and relays as this is an important case for practical systems. Although it is desired that a radio signal transmitted by the relay station is independent from a radio signal transmitted from the transmitter (e.g. frequency domain division FDD or time domain division TDD), also signals not independent from each other can be processed by using the proposed concept.

Further, a receiver concept is described, which is able to deal with a large variety of relay functions used by a relay station for advanced modulation alphabets.

FIG. 1 shows a block diagram of a receiver 100 for decoding a receive signal 102 in a wireless communication system according to an embodiment of the invention. The receiver 100 comprises a signal determiner 110, a soft information determiner 120 and a soft information decoder 130. The signal determiner 110 is connected to the soft information determiner 120 and the soft information determiner 120 is connected to the soft information decoder 130. The signal determiner 110 determines a complex receive value 112 for the receive signal 102 received from a relay station. Further, the soft information determiner 120 obtains a soft information 122 represented by a combination of a first probability value and a second probability value. The first probability value is derivable by adding a value depending on an overall probability density function for each symbol s of a modulation alphabet A comprising a same first bit value (0 or 1) at a same bit position of the symbols, wherein each symbol s of the modulation alphabet A represents at least two bits (e.g. 4 bits for 16-QAM). Further, the overall probability density function indicates a probability of receiving the complex receive value 112, if a signal representing the respective symbol s considered for adding was transmitted from a transmitter to a relay station, wherein the signal representing the respective symbol causes the receive signal 102 received from the relay station. The second probability value is derivable by adding a value depending on the overall probability density function for each symbol s of the modulation alphabet A comprising a same second bit value (1 or 0) at the same bit position of the symbols. The first bit value and the second bit value are different. Further, the soft information decoder 130 decodes payload data 132 contained by the receive signal 102 based on the obtained soft information 122.

By combining the first probability value and the second probability value, the receiver 100 considers a ratio of a bit of the payload data being a logical 0 or a logical 1. For this, symbols with the same first bit value at the same bit position of the symbols are considered for the first probability value and symbols with the same second bit value at the same bit position are considered for the second probability value. For both probability values the respective symbols are considered by evaluated the same overall probability density function. With this soft information 122 the payload data 132 can be decoded. In this way the behavior of a relay station, which forwards data, can be considered more accurate at the receiver 100 for advanced modulation schemes (e.g. 16-QAM). Therefore, the bit error rate may be reduced and/or the mutual information may be increased.

The receive signal 102 may be, for example, a radio signal received from the relay station or a signal obtained by downmixing and digitizing the radio signal received from the relay station. The complex receive value 112 may indicate a point in the complex plane comprising a real component and an imaginary component or may indicate an amplitude and phase of the receive signal 102 for the time interval used for transmitting a symbol. In an ideal system without disturbances or sources of errors, the complex receive value 112 may indicate exactly a symbol s of the modulation alphabet A. Due to disturbances like noise or interferences, the determined complex receive value 112 may represent a point somewhere between the symbols of the modulation alphabet A.

Each symbol s of the modulation alphabet A represents at least two bits such as, for example, 16-QAM (quadrature amplitude modulation) with 4 bits per symbol or 64-QAM with 6 bits per symbol. Since there is more than one bit per symbol, the overall probability density function is considered for each symbol comprising the same bit value at an observed bit position. With the soft information 122 obtained for the observed bit (e.g. the first bit of a symbol or another specific bit of a symbol), the soft information decoder 130 may decide whether the observed bit is a logical 0 or a logical 1. Although the described concept may be used already for symbols representing two bits, the symbols of the modulation alphabet may comprise more than two bits in embodiments.

For example, if each symbol comprising four bits and the last bit position is observed, then the same bit position of the symbols is the last bit of each symbol and the symbols comprising a 0 (or a 1) at the last bit position are considered for the first probability value and the symbols comprising a 1 (or a 0) at the last bit position are considered for the second probability value. Each bit of a symbol may correspond to a bit of the payload data 132, and therefore a soft information 122 may be calculated for each bit of a symbol.

The first probability value and the second probability value are derivable by adding values depending on the overall probability density function. For example, the receiver 100 receives the receive signal from the relay station, but it receives no signal (or a signal with insufficient signal quality) from transmitter directly. In this case, the first probability value and the second probability value may be derivable by adding values of the overall probability density function. Alternatively, the receiver 100 may receive the receive signal from the relay station and a receive signal from the transmitter directly. In this case, the first probability value and the second probability may be derivable by adding values of a product of the overall probability density function and a probability density function depending on the receive signal received from the transmitter.

The overall probability density function takes into account a probability of receiving the determined complex receive value, if a specific symbol was transmitted by the transmitter to the relay station and after processing by the relay station transmitted to the receiver. In other words, the signal representing the respective symbol causes the receive signal 102. In this way, the overall probability density function considers the behavior of the relay station. For example, it takes into account whether the relay station uses an amplified forward method, a decode forward method, an estimate forward method or another relay method. This may be done, for example, by considering a relay function used by the relay station for relaying a signal received from the transmitter to the receiver by the overall probability density function.

The overall probability density function depends on the specific symbol originally transmitted from the transmitter. Therefore, the overall probability density function is considered for each symbol comprising the first bit value at the observed bit position for the first probability value. Further, the overall probability density function is considered for each symbol comprising the second bit value at the observed bit position for the second probability value.

The soft information decoder 130 may decode the payload data 132 contained by the receive signal in various ways, some of them are mentioned later on. One example may be to determine a soft information 122 for each bit of the payload data 132 and decide based on the respective soft information 122 whether a bit is a logical 1 or a logical 0. Further, a channel coding or interleaving of the receive signal 102 may be considered by the soft information decoder 130.

The receiver 100 may be part of a user equipment as for example a mobile phone or laptop or part of a base station as for example an evolved node B (eNB).

In some embodiments of the invention, the soft information determiner 120 may determine the soft information by itself. For this, the soft information determiner 120 may calculate the first probability value by adding a value depending on the overall probability density function for each symbol s of the modulation alphabet A comprising the same first bit value at the same bit position of the symbols. Further, the soft information determiner 130 may calculate the second probability value by adding a value depending on the overall probability density function for each symbol s of the modulation alphabet A comprising the same second bit value at the same bit position of the symbols. Then, the soft information determiner 130 may combine the first probability value and the second probability value to obtain the soft information 122.

For example, the soft information determiner 120 may combine the first probability value and the second probability value by dividing the first probability value by the second probability value.

Figure 2:
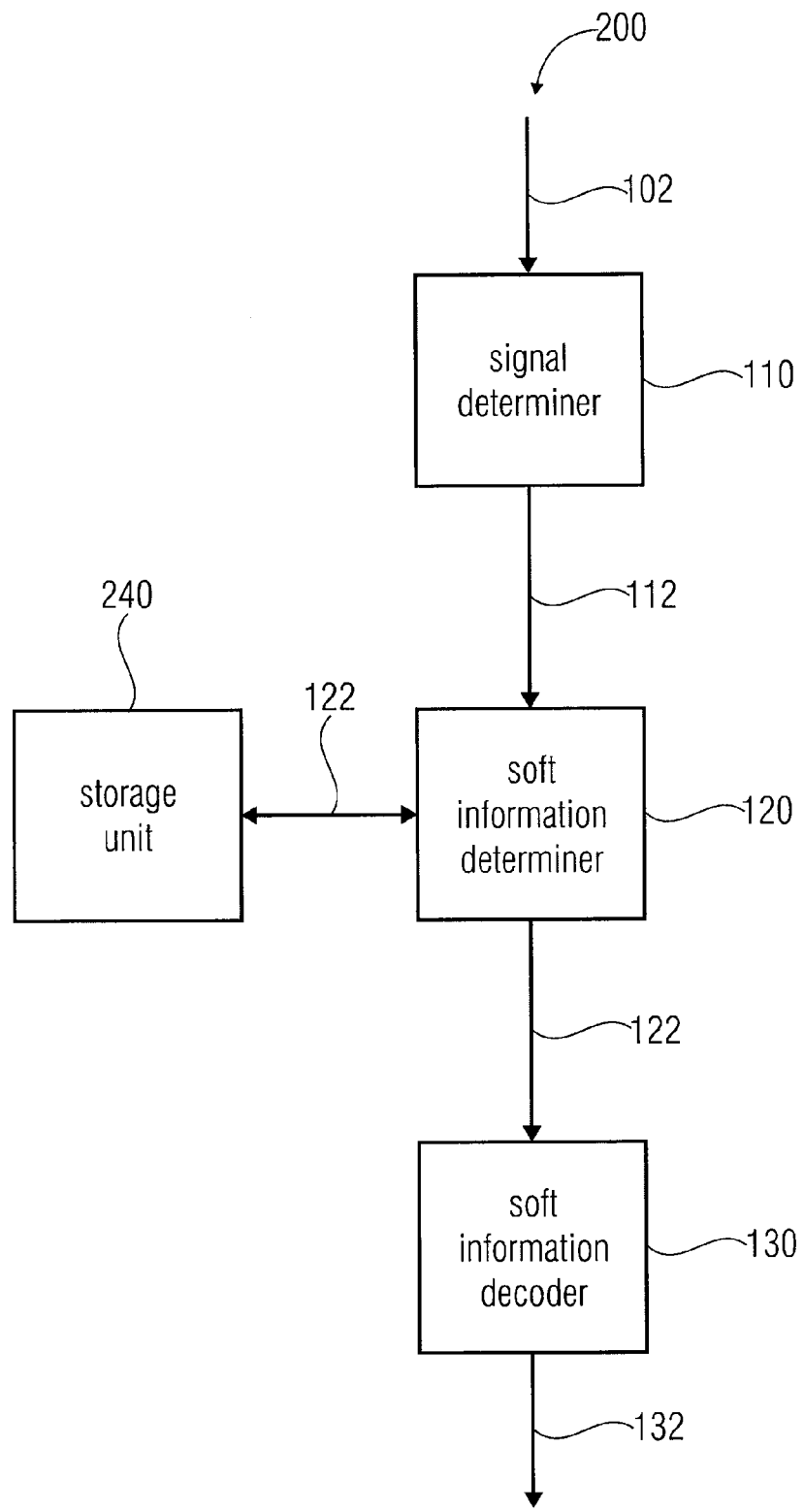
FIG. 2 is a block diagram of a receiver.

In some other embodiments, the receiver 100 may comprise a storage unit configured to store a lookup table containing a plurality of soft information for a plurality of predefined complex receive values. FIG. 2 shows an example for such a receiver 200 according to an embodiment of the invention. The receiver 200 is similar to the receiver shown in FIG. 1, but comprises additionally a storage unit 240 connected to the soft information determiner 120. In this example, the soft information determiner 120 may determine a soft information 122 for decoding based on the plurality of soft information contained by the lookup table depending on the determined complex receive value 112. In other words, instead of calculating the soft information for each bit of the receive signal, a plurality of soft information may be predetermined and stored in a lookup table. For example, the soft information determiner 120 may select one of the stored soft information (e.g. the soft information corresponding to the predefined complex receive value closest to the determined complex receive value) or may interpolate between soft information of two neighboring predefined complex receive values, if the determined complex receive value lies between the two neighboring predefined complex receive values (e.g. by linear interpolation).

The lookup table may contain a plurality of soft information for one or more different modulation alphabets A. In this way, a receiver can be adapted to a specific application, so that the storage space of the storage unit 240 can be reduced, or the receiver can be used more flexibly for several different modulation alphabets A.

By using a lookup table containing a predetermined plurality of soft information, the hardware effort and/or the process time for decoding can be significantly reduced in comparison to a receiver calculating the soft information by itself. On the other hand, if the soft information determiner 120 calculates the soft information by itself, the bit error rate may be further decreased and/or the mutual information may be further increased in comparison to a receiver using a lookup table, since the soft information may be calculated more accurately.

The signal determiner 110, the soft information determiner 120, the soft information decoder 130 and the storage unit 240 may be, for example, independent hardware units or part of a digital signal processor, a microcontroller or a computer as well as a computer program or a software product for running on a digital signal processor, a microcontroller or a computer.

In some embodiments according to the invention, the overall probability density function may be based on a relay function known by the receiver. This known relay function is used by the relay station to determine a radio signal to be transmitted to the receiver based on a radio signal received from the transmitter. In other words, the relaying from signals received from the transmitter to the receiver is based on the relay function.

Some possible relay functions are already mentioned above (for amplify forward, detect forward and minimum mean square error relaying without channel coding). Further, the relay station may consider a channel coding of a signal and may perform a soft output channel decoding, as for example shown in "P. Weitkemper, D. Wübben, and K.-D. Kammeyer. Minimum MSE Relaying for Arbitrary Signal Constellations in Coded Relay Networks. In IEEE Vehicular Technology Conference, Barcelona, Spain, April 2009".

For memoryless channels as uncoded AWGN (additive white Gaussian noise), one element $\tilde{s}_R$ depends only on one received symbol $\tilde{s}_R = f(y_{SR})$. But in a coded system the relay can make use of the channel code, and as a consequence, the channel is not memoryless and the whole receive vector and the code constraint may be considered. In this case the relay function can be expressed more generally as $$x_R = f(y_{SR}, C). \tag{10a}$$

The conditional expectation of the transmitted bits minimizes the MSUE (mean squared error) at the destination.

$$\tilde{s}_R = E\{s|y_{SR}, C\}. \tag{10b}$$

The resulting estimated symbol $\tilde{s}_R$ is then normalized to the power constraint of the relay.

To extend the DEF relay function to higher order modulation schemes, the general definition of the expectation value given by the sum of all symbols weighted by the corresponding symbol probability is considered $$E\{s \mid y_{SR}, C\} = \sum_s s \cdot p(s \mid y_{SR}, C). \tag{10c}$$

Symbol probabilities based on the product of APP (a posteriori) probabilities delivered by the channel decoder are suboptimal, because bits corresponding to one symbol are not independent. To calculate the conditional probability $p(s|y_{SR}, C)$ correctly, it can be split up into an intrinsic and an extrinsic part $$p(s|y_{SR}, C) \propto p(s|y_{SR/y}, C). \tag{10d}$$

The probability $p(s|y_{SR/y}, C)$ denotes the extrinsic probability delivered by the channel decoder about s. It can be calculated as the product of the corresponding extrinsic code bit probabilities as these probabilities can be assumed to be independent of each other $$p(s \mid y_{SR/y}, C) = \prod_i^{ld(M)} p(d_i(s) \mid y_{SR/y}, C) \tag{10e}$$

Here, $p(d_i(s)|y_{SR/y}, C)$ denotes the extrinsic probability of the i-th bit of symbol s conditioned on the received vector and the code constraint. The intrinsic part $p(y_{SR}|s)$ in equation (10d) is the probability based on the channel observation.

Summarizing, the relay function may be based on, for example, $$f(y_{SR}) = \beta E\{s \mid y_{SR}\} = \beta \sum_{s \in A} sp(s \mid y_{SR}).$$

-continued or $$f(y_{SR}) = \beta E\{s \mid y_{SR}, C\} = \beta \sum_{s \in A} s \cdot p(s \mid y_{SR}, C)$$

or $$f(y_{SR}) = \hat{s} = \max_{s \in A} p(s \mid y_{SR}).$$

or $$f(y_{SR}) = \beta_{AF} \cdot y_{SR}$$

As it can be seen, in some examples, the relay function may be based on a scaling factor (e.g. β or $\beta_{AF}$) and a relay probability density function (e.g.

$$\sum_{s \in A} s \cdot p(s \mid y_{SR}) \text{ or } y_{SR}).$$

In some embodiments according to the invention, the receiver comprises a storage unit for storing a scaling factor of the relay function $f(y_{SR})$ and to provide a scaling factor β to the soft information determiner 130 for determining the soft information. In this case, the soft information determiner 120 may determine a new scaling factor and update the stored scaling factor by the new scaling factor, if a noise information contained by the receive signal changes more than a predefined threshold. The noise information contained by the receive signal indicates a noise level of a channel between the transmitter and the relay station. In other words, the scaling factor used by the relay station for determining a signal to be transmitted to the receiver may depend on a noise level of the channel between the transmitter and the relay station. Since the noise information indicating the noise level of the channel between the transmitter and the relay station is contained by the receive signal, the receiver can update the scaling factor used for determining the soft information. By choosing the predefined threshold, an accuracy of considering a variation of the scaling factor can be adapted. A large predefined threshold reduces the computational efforts, while a low predefined threshold may increase the accuracy.

The storage unit for storing the scaling factor may be implemented in the same way as the storage unit for storing the lookup table shown in FIG. 2.

In some embodiments according to the invention, the soft information 122 represents the logarithm of the first probability value divided by the second probability value, so that the soft information 122 represents a logarithmic likelihood ratio. Since the first probability value indicates a probability of a bit being equal to the first bit value and the second probability value indicating a probability of the bit being equal to the second bit value, calculating the logarithm of the first probability value divided by the second probability value results in a logarithmic likelihood ratio (LLR).

In some embodiments according to the invention, the overall probability density function may depend on the noise levels of the channel from transmitter to the relay station and from the relay station to the receiver. An information about the noise level of the channel between the transmitter and the relay station may be transmitted from the relay station to the receiver, so that this information may be contained by the receive signal. Further, the relay station may also transmit information about the noise level of the channel between the relay station and the receiver to the receiver. Alternatively, the receiver may measure or determine the noise level of the channel between the relay station and the receiver by itself. In other words, the signal determiner 110 may determine or extract a first noise information from the receive signal indicating a noise level of a channel between the relay station and the receiver. Further, the signal determiner 110 may extract a second noise information contained by the receive signal 102 indicating a noise level of a channel between the transmitter and the relay station. In this example, the overall probability density function may depend on the first noise information and on the second noise information. For example, the first noise information may be the variance $\sigma_D^2$ of the noise of the channel between the relay station and the receiver and the second noise information may be the variance $\sigma_R^2$ of the noise of the channel between the transmitter and the relay station.

If the receiver is implemented with a storage unit containing a lookup table with a plurality of soft information, as shown in FIG. 2, the lookup table may contain soft information for the plurality of predefined complex receive values and additionally for a plurality of predefined first noise information values and a plurality of predefined second noise information values. In other words, each soft information contained by the lookup table depends on a predefined complex receive value and additionally on a predefined first noise information value and a second noise information value. In this way, the soft information determiner 130 may determine the soft information for decoding depending on the determined complex receive value, the determined first noise information and the determined second noise information.

In some embodiments according to the invention a signal is also received directly from the transmitter. Therefore, the receive signal received from the transmitter may be considered additionally to the receive signal received from the relay station. For this, the soft information determiner 120 may obtain the first probability value and the second probability value depend on a product of the overall probability density function and a probability density function depending on a receive signal received from the transmitter. Although the receive signal received from the transmitter may contain the same payload data 132 as the receive signal received from the relay station, a time alignment may be necessitated, since it is likely that the two signals are received at different times.

In the following, the inventive concept is described in more detail for an example using a maximum likelihood detection for a minimum mean square error relaying. Although the concept is described for a receiver receiving signals from the relay station and the transmitter, it can be seen that the concept also works for a receiver only receiving a signal from the relay station (or a plurality of relay stations).

Maximum-Likelihood detection (decoding payload data based on the soft information) can be performed by calculating the Log-Likelihood Ratio (LLR) based on the pdfs of the received signal which can be combined with other pdfs or directly fed to a soft-input channel decoder (soft information decoder). The LLR of a bit is defined as $$L(d) = \ln\left(\frac{p(d=0 \mid y_{RD}, y_{SD})}{p(d=1 \mid y_{RD}, y_{SD})}\right). \quad (11)$$

Due to the independency of the two received signals $y_{SD}$ and $y_{RD}$ in terms of symbol s this term can be split up $$p(s \mid y_{RD}, y_{SD}) \propto p(s \mid y_{RD}) \cdot p(s \mid y_{SD})$$

$$
\begin{aligned}
L(d) &= \ln\left(\frac{p(y_{RD}, y_{SD} \mid d = 0)}{p(y_{RD}, y_{SD} \mid d = 1)}\right) \\
&= \ln\left(\frac{\sum_{c \in A_v^0} p(y_{RD}, y_{SD} \mid c)}{\sum_{c \in A_v^1} p(y_{RD}, y_{SD} \mid c)}\right) \\
&= \ln\left(\frac{\sum_{c \in A_v^0} p(y_{RD} \mid c) \cdot p(y_{SD} \mid c)}{\sum_{c \in A_v^1} p(y_{RD} \mid c) \cdot p(y_{SD} \mid c)}\right)
\end{aligned}
$$

$$
L(d) = \ln\left(\frac{\sum_{s \in A_v^0} \int_{-\infty}^{\infty} e^{-\frac{|y_{RD} - f(y_{SR})|^2}{2\sigma_D^2}} \cdot e^{-\frac{|y_{SR} - s|^2}{2\sigma_R^2}} dy_{SR} \cdot e^{-\frac{|y_{SD} - s|^2}{2\sigma_D^2}}}{\sum_{s \in A_v^1} \int_{-\infty}^{\infty} e^{-\frac{|y_{RD} - f(y_{SR})|^2}{2\sigma_D^2}} \cdot e^{-\frac{|y_{SR} - s|^2}{2\sigma_R^2}} dy_{SR} \cdot e^{-\frac{|y_{SD} - s|^2}{2\sigma_D^2}}}\right)
$$

$$
= \ln\left(\frac{\sum_{s \in A_v^0} \int_{-\infty}^{\infty} e^{\frac{-\sigma_R^2 |y_{RD} - \beta \sum_{s' \in A} s' p(s' \mid y_{SR})|^2 - \sigma_D^2 |y_{SR} - s|^2}{2\sigma_D^2 \sigma_R^2}} dy_{SR} \cdot e^{-\frac{|y_{SD} - s|^2}{2\sigma_D^2}}}{\sum_{s \in A_v^1} \int_{-\infty}^{\infty} e^{\frac{\sigma_R^2 |y_{RD} \beta \sum_{s' \in A} s' p(s' \mid y_{SR})|^2 \sigma_D^2 |y_{SR} s|^2}{2\sigma_D^2 \sigma_R^2}} dy_{SR} \cdot e^{-\frac{|y_{SD} - s|^2}{2\sigma_D^2}}}\right)
$$
(12)

If the observations are also independent in terms of the information bits d, this can further be simplified to $$L(d) = \ln\left(\frac{\sum_{s \in A_v^0} p(y_{SD} \mid s)}{\sum_{s \in A_v^1} p(y_{SD} \mid s)}\right) + \ln\left(\frac{\sum_{s \in A_v^0} p(y_{RD} \mid s)}{\sum_{s \in A_v^1} p(y_{RD} \mid s)}\right) \quad (13)$$

where the first part, denoted as $L_{SD}$, is quite clear as this belongs to a Gaussian channel. The second part $L_{SRD}$ is not based on a Gaussian channel as the nonlinear relay function is involved and therefore necessitates the knowledge of a more complicated probability density function (pdf) that will be investigated in the following.

The simplification described by equation (13) can be used, for example, when the modulation alphabet used by the transmitter differs from the modulation alphabet used by the relay station (e.g. different constellation of the same modulation alphabet or different modulation alphabets). Alternatively, equation (13) may be used, although the bits of a symbol used by the transmitter and the bits of the symbols used by the relay station are not independent from each other, since the errors caused by the simplification may be negligible or acceptable in comparison to the reduced computational effort.

Regardless whether equation (12) or (13) is used, the main challenge is to calculate $p(y_{RD} \mid c)$. For better readability in the following derivations, $P_S = P_R = 1$ and $h_{SR} = h_{RD} = h_{SD} = 1$ is assumed without loss of generality. Furthermore, the case of independent observations is described in (13). The application of (12) is then straightforward. As the transmitted bits are assumed to be equally likely, $L_{SRD}$ can be expressed as $$L_{SRD}(d) = \ln\left(\frac{p(y_{RD} \mid d = 0)}{p(y_{RD} \mid d = 1)}\right). \quad (14)$$

The probabilities in equation (13) are equal to $$p(y_{RD} \mid d) = \sum_{s \in A_v^d} p(y_{RD} \mid s) \quad (15)$$

where $A_v^d$ represents the set of modulation symbols mapped to bit tuples with $d \in \{0, 1\}$ at the v-th position (symbols comprising the same bit value at the same bit position). The pdf $p(y_{RD} \mid s)$ can be calculated with the help of the transformation of densities $$p(f(y)) = p(y) \frac{dy}{df(y)} \quad (16)$$

and the fact that $$p(x) = \int_{-\infty}^{\infty} p(x \mid y) p(y) dy. \quad (17)$$

This leads to a quite simple formula for the density $$p(y_{RD} \mid s) = \int_{-\infty}^{\infty} p(y_{SD} \mid f(y_{SR})) \cdot p(y_{SR} \mid s) dy_{SR}. \quad (18)$$

Equation (18) is one example for an overall probability density function. More general, the overall probability density function may be based on a first probability density function $p(y_{RD} \mid f(y_{SR}))$ indicating a probability of receiving the complex receive value $y_{RD}$, if the relay station transmits a radio signal containing a complex transmit value determined by the relay function $f(y_{SR})$. Further, the overall probability density function may be based on a second probability density function $p(y_{SR}|s)$ indicating a probability of receiving a received signal with a complex receive value $y_{SR}$ from the transmitter at the relay station, if the respective symbol s considered for adding was transmitted to the relay station by the transmitter. The first probability density function and the second probability density function may be normal distributions, for example.

Figure 6:
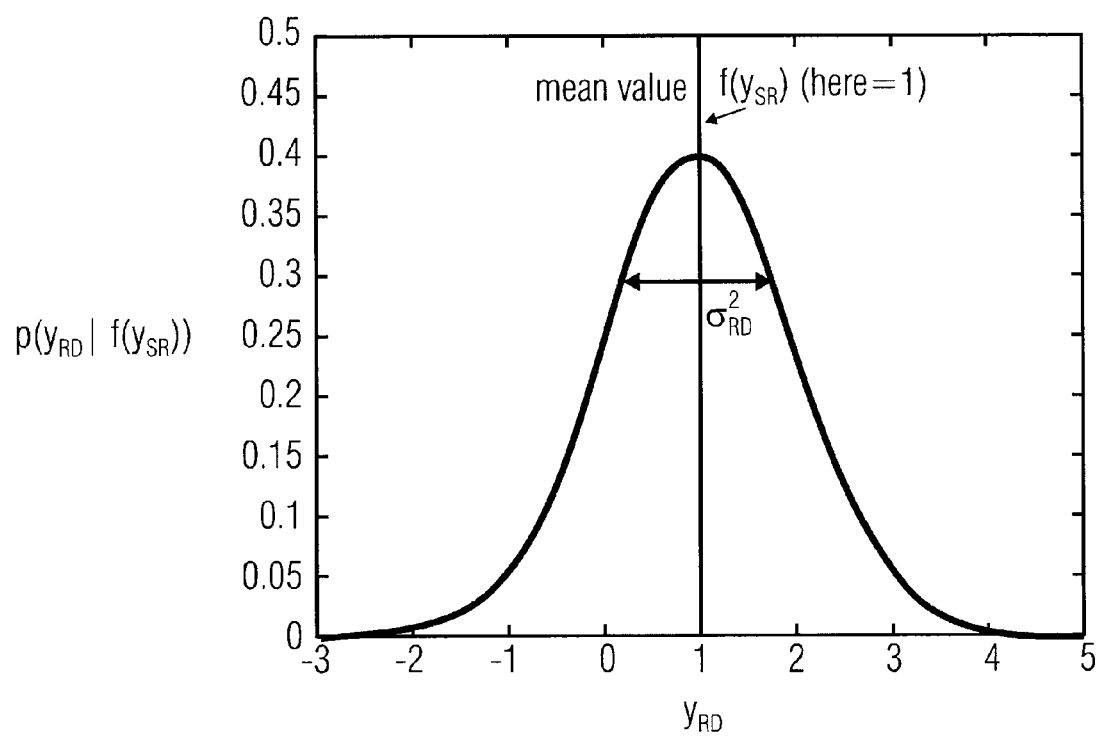
FIG. 6 is a schematic illustration of a probability density function.

FIG. 6 shows an example for the first probability density function $p(y_{RD}|f(y_{SR}))$ indicating a Gaussian distribution with the mean value being $f(y_{SR})$, which depends on the complex receive value $y_{SR}$ from the receive signal received by the relay station from the transmitter. For obtaining a soft information at the receiver, the relay station may transmit the variance $\sigma_R^2$ (second noise information).

In other words, the first probability density function indicates a probability, that a specific value $y_{RD}$ is received (by the receiver), if the relay station transmits $f(y_{SR})$. The receiver does not know the exact transmit value transmitted by the relay. Therefore, all possible values of $f(y_{SR})$ are observed, weighted with the probability for the occurrence of the value $p(y_{SR}|s)$ and finally integrated over all values (or added).

An important aspect of the described concept may be that the whole calculation (of the soft information) is based on Gaussian distributions, and only the used modulation (modulation alphabet), the relay function and the noise variances of the two channels have to be known (at the receiver), for example. Therefore, it may be possible to calculate the maximum likelihood exactly and efficiently.

Inserting equation (18) and equation (15) into equation (14) a closed solution for calculating the LLR for this setup can be obtained.

$$L_{SRD} = \ln\left( \frac{\sum_{s \in A_v^0} \int_{-\infty}^{\infty} p(y_{RD}|f(y_{SR})) \cdot p(y_{SR}|s) d y_{SR}}{\sum_{s \in A_v^1} \int_{-\infty}^{\infty} p(y_{RD}|f(y_{SR})) \cdot p(y_{SR}|s) d y_{SR}} \right), \quad (19)$$

where the function $f(\cdot)$ is determined, for example, by equation (10) and therefore known to the receiver. All densities in equation (19) are simple normal distributions with different mean values and variances.

$$L_{SRD} = \ln\left( \frac{\sum_{s \in A_v^0} \int_{-\infty}^{\infty} e^{-\frac{|y_{RD}-f(y_{SR})|^2}{2\sigma_D^2}} \cdot e^{-\frac{|y_{SR}-s|^2}{2\sigma_R^2}} d y_{SR}}{\sum_{s \in A_v^1} \int_{-\infty}^{\infty} e^{-\frac{|y_{RD}-f(y_{SR})|^2}{2\sigma_D^2}} \cdot e^{-\frac{|y_{SR}-s|^2}{2\sigma_R^2}} d y_{SR}} \right) \quad (20)$$

$$= \ln\left( \frac{\sum_{s \in A_v^0} \int_{-\infty}^{\infty} e^{\frac{-\sigma_R^2 |y_{RD}-\beta \sum_{s' \in A} s' p(s'|y_{SR})|^2 - \sigma_D^2 |y_{SR}-s|^2}{2\sigma_D^2 \sigma_R^2}} d y_{SR}}{\sum_{s \in A_v^1} \int_{-\infty}^{\infty} e^{\frac{-\sigma_R^2 |y_{RD}-\beta \sum_{s' \in A} s' p(s'|y_{SR})|^2 - \sigma_D^2 |y_{SR}-s|^2}{2\sigma_D^2 \sigma_R^2}} d y_{SR}} \right)$$

with the factor $\beta$ ensuring the power constraint of the relay $$\beta = \frac{1}{\sqrt{\int_{-\infty}^{\infty} |E\{s|y_{SR}\}|^2 \cdot p(y_{SR}) d y_{SR}}}. \quad (21)$$

This equation can be evaluated very efficiently by mainly calculating two Gaussian densities and a numerical integration as shown in the following. Starting with a simple Gaussian distribution sufficiently sampled, all necessitated values and densities can be obtained very simple. It should be noted, that the first four steps of the following implementation example have to be done only once per frame or even less, as the expressions do not depend on the actual received signal but only on the SNR (signal to noise ratio) of the first hop (transmission from the transmitter to the relay station). Only the later steps have to be executed per received value (for each bit of a symbol).

Firstly, for all possible transmit symbols $s \in A$ $$p(y_{SR}|s) = \frac{1}{\sqrt{2\pi\sigma_R^2}} \exp\left(-\frac{|y_{SR}-s|^2}{2\sigma_R^2}\right)$$

Is calculated (e.g. representing a Gaussian distribution).

Secondly, $p(y_{SR})$ is calculated with the result for $p(y_{SR}|s)$.

$$p(y_{SR}) = \sum_{s \in A} p(y_{SR}|s) \cdot p(s)$$

For equal likely symbols $p(s)=1/1d(M)$, wherein M is the number of symbols (e.g. 16 for 16-QAM).

Thirdly, $E\{s|y_{SR}\}$ is calculated with the results for $p(y_{SR})$ and $p(y_{SR}|s)$.

$$E\{s|y_{SR}\} = \sum_{s \in A} s \cdot p(y_{SR}|s) \cdot \frac{p(s)}{p(y_{SR})}$$

Fourthly, the normalization factor $\beta$ is determined with the results for $p(y_{SR})$ and $E\{s|y_{SR}\}$.

$$\beta = \frac{1}{\sqrt{\int_{-\infty}^{\infty} |E\{s|y_{SR}\}|^2 \cdot p(y_{SR}) d y_{SR}}}$$

Fifthly, $p(y_{RD}|s)$ for each $s \in A$ is calculated with the results above.

$$p(y_{RD}|s) = \int_{-\infty}^{\infty} \frac{1}{\sqrt{2\pi\sigma_D^2}} \exp\left(-\frac{|y_{RD}-f(y_{SR})|^2}{2\sigma_D^2}\right) p(y_{SR}|s) d y_{SR}$$

Finally, the LLR is calculated $$L_{SRD} = \ln\left(\frac{\sum_{s \in A_v^0} p(y_{RD}|s)}{\sum_{s \in A_v^1} p(y_{RD}|s)}\right)$$

All densities may be known as long as the Signal-to-Noise Ratios (SNR) of both hops are known at the receiver, for example. This information may be necessitated anyway also for AF and DetF and has either to be estimated or to be signaled to the destination. At the end the obtained pdf $p(y_{RD}|c)$ for the signal from the relay can be combined with those for the direct link to calculate the LLRs or in the case of independence by just summing up the different LLRs. The resulting output can directly be fed into the channel decoder.

For a fair comparison, a ML detector may be used also for the DetF relaying function. For DetF often a suboptimal detector based on an equivalent Gaussian channel is used especially for higher order modulation schemes. The proposed ML detector for DetF is easy to implement due to the simple relay function. The Log-Likelihood Ratio (LLR) defined similar to equation (12) for DetF relay can be expressed with a different calculation of $$p(y_{RD}|d) = \sum_{s \in A_v^d} p(y_{RD}|s) \quad (22)$$

$$= \sum_{s \in A_v^d} \sum_{\hat{s}_R \in A} p(y_{RD}|\hat{s}) \cdot p(\hat{s}|s)$$

with $\hat{s}$ denoting the symbol transmitted by the relay and $s \in A_v^{0/1}$ the symbols s corresponding to bit tuples with the v-th bit equal 0 or 1. The expression $p(y_{RD}|s)$ describes the second hop, meaning the probability of receiving $y_{RD}$, conditioned on $\hat{s}$ being transmitted by the relay. This simply corresponds to a Gaussian distribution with mean $\hat{s}$.

$$p(y_{RD}|\hat{s}) = \frac{1}{\sqrt{\pi\sigma_D^2}}\exp\left(-\frac{|y_{RD}-\hat{s}|^2}{\sigma_D^2}\right) \quad (23)$$

This conditioned pdf is weighted with the probability $p(\hat{s}|s)$ and summed up over all possible values of $\hat{s}$. The probability $p(\hat{s}|s)$ describes the transition probability of the equivalent channel between source and the relay's output, meaning that the relay transmitted $\hat{s}$ conditioned on the source transmit symbol being s, corresponding to the symbol error probability. These derivations lead to the distribution of $y_{RD}$ for all possible transmit symbols, enabling the calculation of the LLRs for each bit.

In some embodiments of the invention, the soft information represents an approximated combination of the first probability value and the second probability value. This may be done by a fitting algorithm or by a piecewise linear approximation, for example.

Figure 8:
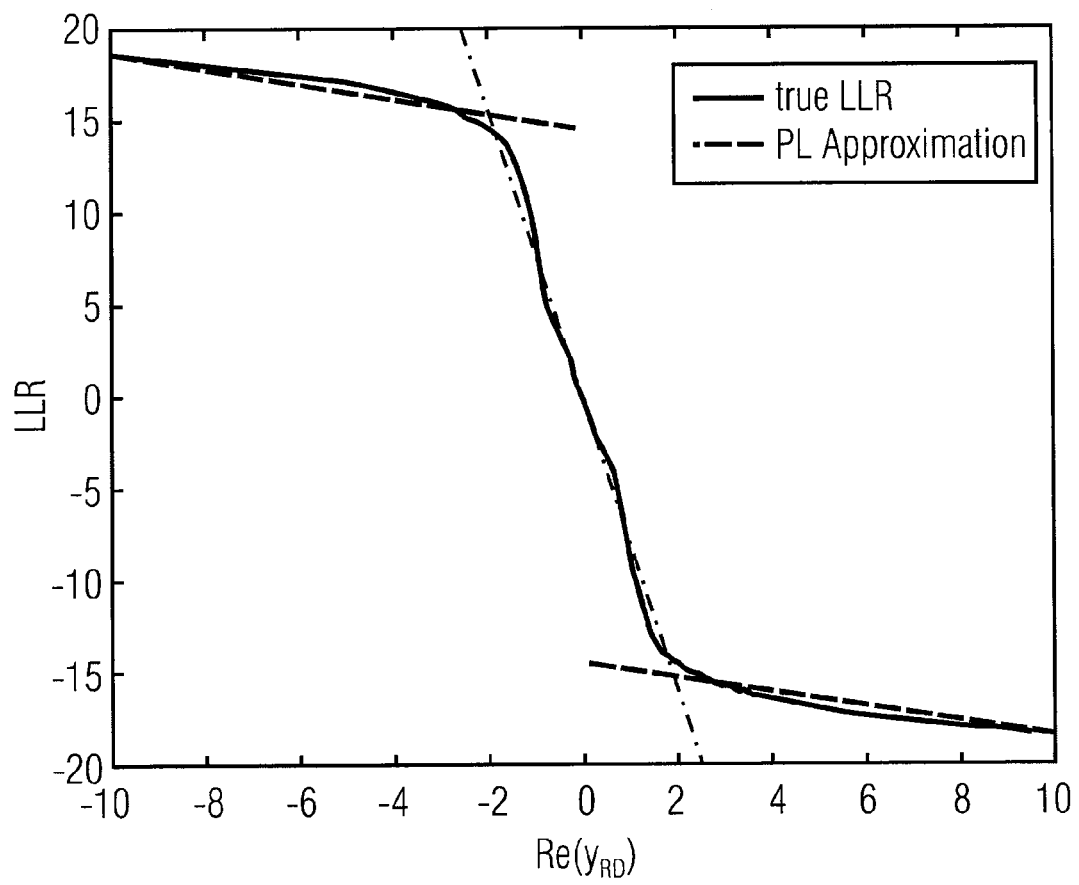
FIG. 8 is a schematic illustration of a piecewise linear approximation of a logarithmic likelihood ratio.
Figure 9:
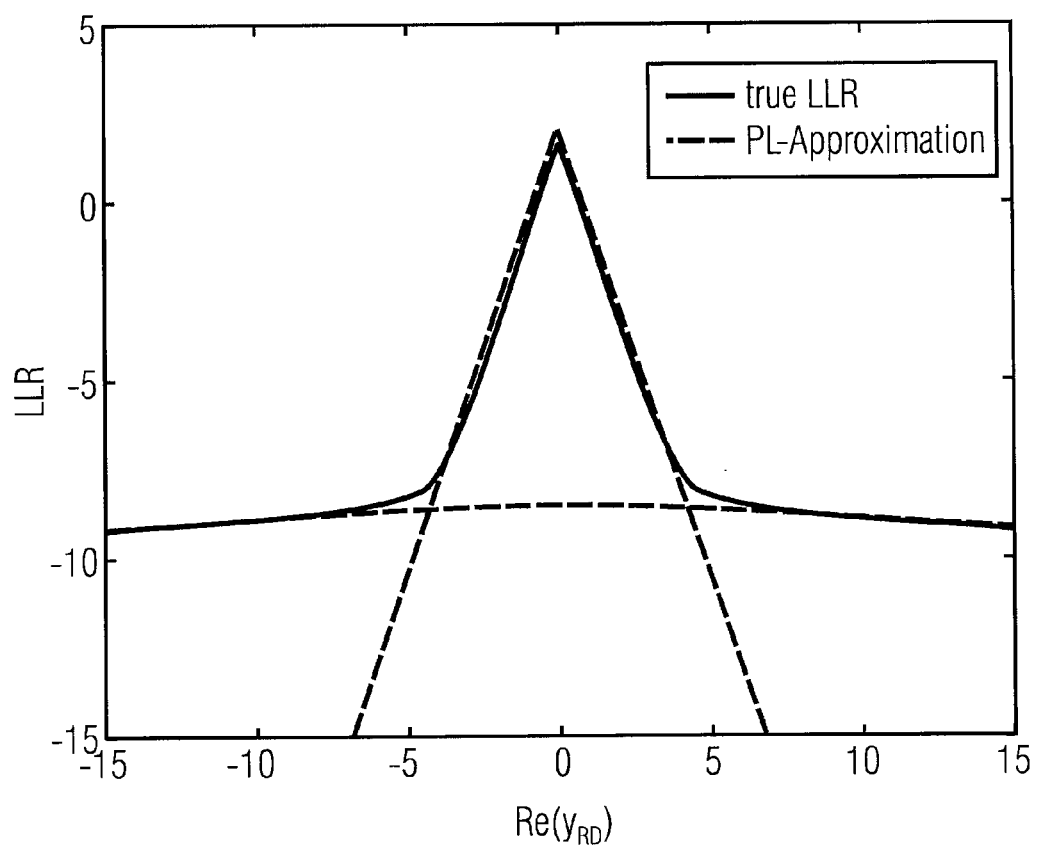
FIG. 9 is another schematic illustration of a piecewise linear approximation of a logarithmic likelihood ratio.

For the case that the soft information represents a logarithmic likelihood ratio, an example for a piecewise linear approximation is shown in FIG. 8. It shows an example for a signal to noise ratio of the channel between the transmitter and the relay station of 17 dB and a signal to noise ratio of the channel between the relay station and the receiver of 3 dB. The logarithmic likelihood ratio values are illustrated for the second bit (of a symbol) of the 16-QAM. The true logarithmic likelihood ratio (LLR) is approximated piecewise by three lines in the observed range of the real component of the complex receive value Re($y_{RD}$). A further example is shown in FIG. 9. In this case, the signal to noise ratio of the channel between the transmitter and the relay station as well as the signal to noise ratio of the channel between the relay station and the receiver is equal to 10 dB and the logarithmic likelihood ratio values of the first bit (of a symbol) of a 16-QAM are illustrated. The true logarithmic likelihood ratio is approximated by four lines in the observed region.

For example, with a piecewise logarithmic approximation of the logarithmic likelihood ratio (or more general of the combination of the first probability value and the second probability value), the storage space of the storage unit of a receiver implementation using a lookup table for the soft information can be reduced, since storing two different soft information for each approximation line (e.g. the intersection points of the approximation lines) may be sufficient.

Figure 10:
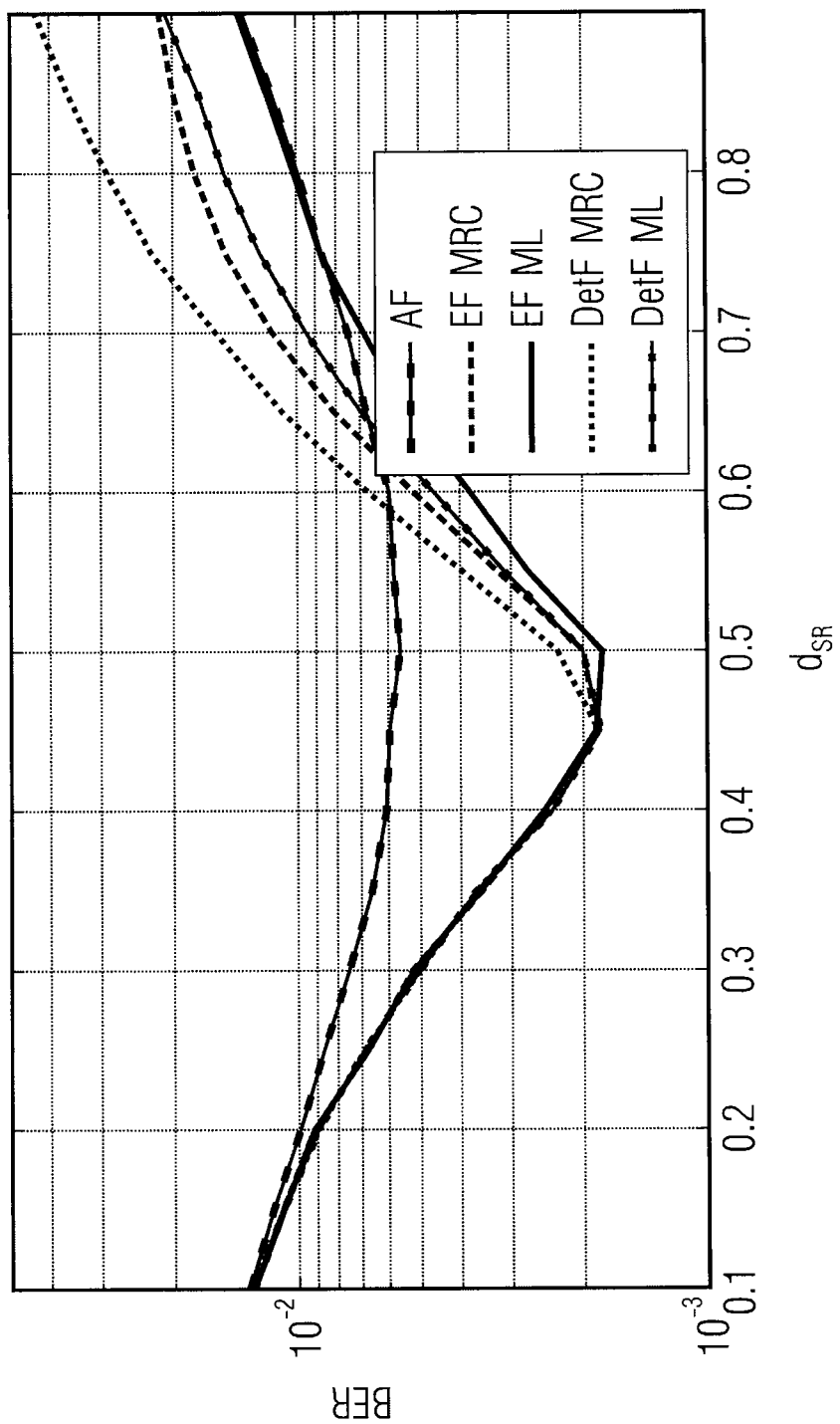
FIG. 10 is a diagram indicating an uncoded bit error rate at the receiver for 16-QAM after maximum likelihood or maximum ratio combining versus a distance between source and relay.

In the following, some simulation results are shown. The simulation results with this ML-detection are illustrated in two different ways. In FIG. 10 a system with a geographical model is used, where the relay is on the direct line between source and destination. It shows a diagram indicating an uncoded bit error rate at the receiver for 16-QAM after maximum likelihood or maximum ratio combining versus the distance between source (transmitter) and relay. The relay joins the line between the source S (transmitter) and the destination D (receiver) with a signal to noise ratio $SNR_{SD}$=10 dB. Bit error rates (BER) are shown for amplify forward (AF), estimate forward with maximum ratio combining (EF MRC), estimate forward with maximum likelihood (EF ML), detect forward with maximum ratio combining (DetF MRC) and detect forward with maximum likelihood (DetF ML). All results here are for AWGN channels without fading and the path loss exponent is equal to 2. In this figure the uncoded bit error rate (BER) is shown versus the location of the relay. In addition the results for a linear combining approach are shown. For EF an effective channel is assumed as done in "P. Weitkemper, D. Wübben, and K.-D. Kammeyer, "Minimum MSE Relaying for Arbitrary Signal Constellations in Coded Relay Networks," in IEEE Vehicular Technology Conference, Barcelona, Spain, April 2009". For DetF the first hop was assumed to be error-free so only the SNR of the second hop was taken into account. The first observation is that in both cases the ML detection shows significant gains.

Furthermore, it can be seen, that AF shows bad performance when the relay is in the middle whereas DetF and EF show good results. The most interesting case is when the relay is near the destination. Here AF becomes better than DetF as is well known and has been often observed. But EF with ML-detection outperforms DetF clearly and is nearly as good as AF. This means that EF is suitable for all locations of the relay. Although not shown here due to space limitations this is also valid if the relay is not on the direct line or if the SNR on the direct link differs.

Another important measure is the mutual information (MI) at the output of the combiner as this determines the result if channel decoding is applied. If perfect channel coding is assumed, the maximum code rate which can still be decoded without errors is equal to the mutual information at the input of the decoder. This means, the larger the MI gets, the higher the coding rate that can be chosen while still ensuring correct reception. In many communication system the applied channel codes are close to these perfect codes, as e.g. turbo codes in LTE systems.

Figure 11:
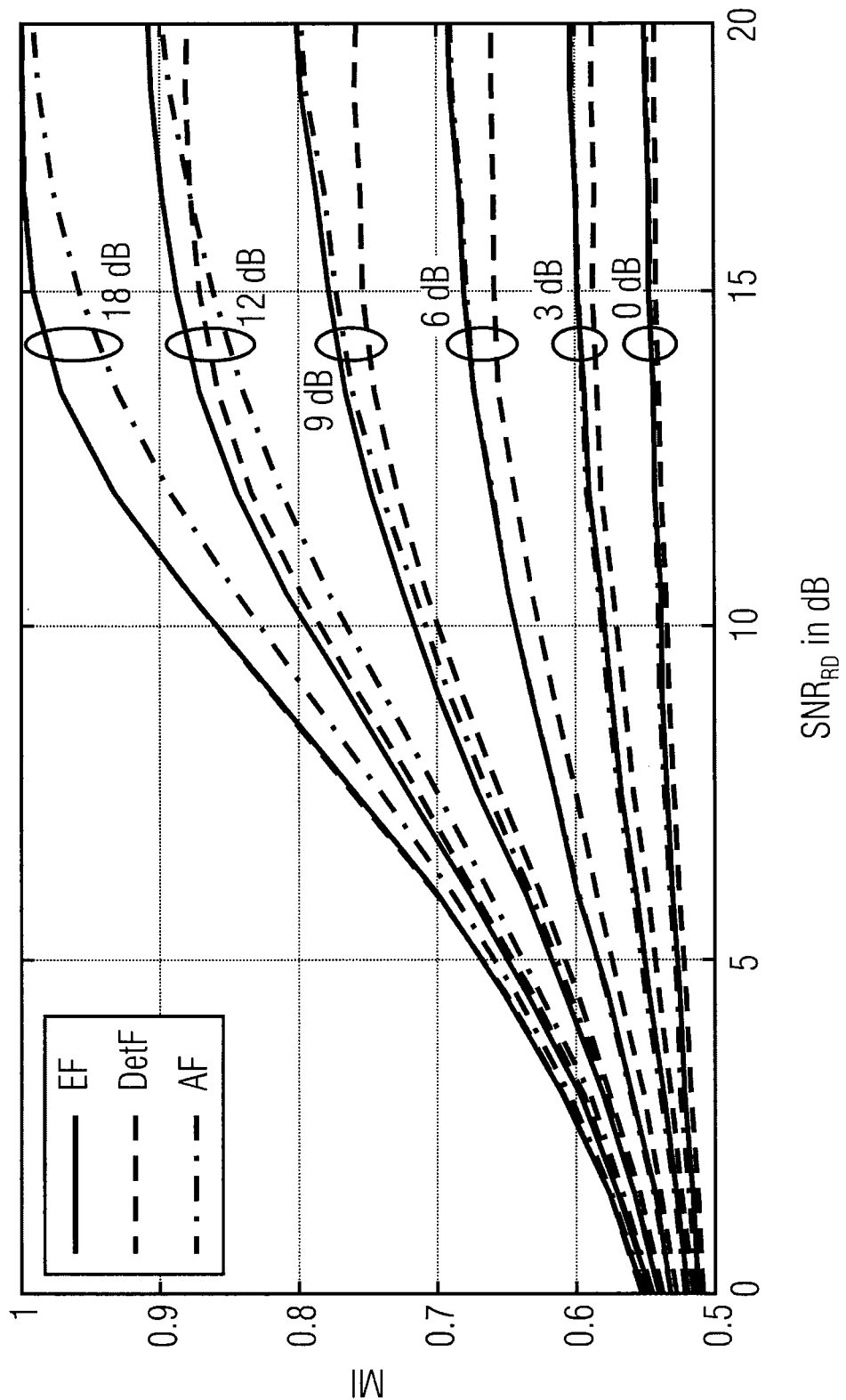
FIG. 11 is a diagram indicating the mutual information at the receiver for 16-QAM after maximum likelihood combining for different values of $SNR_{SR}$ and $SNR_{RD}$.
Figure 12:
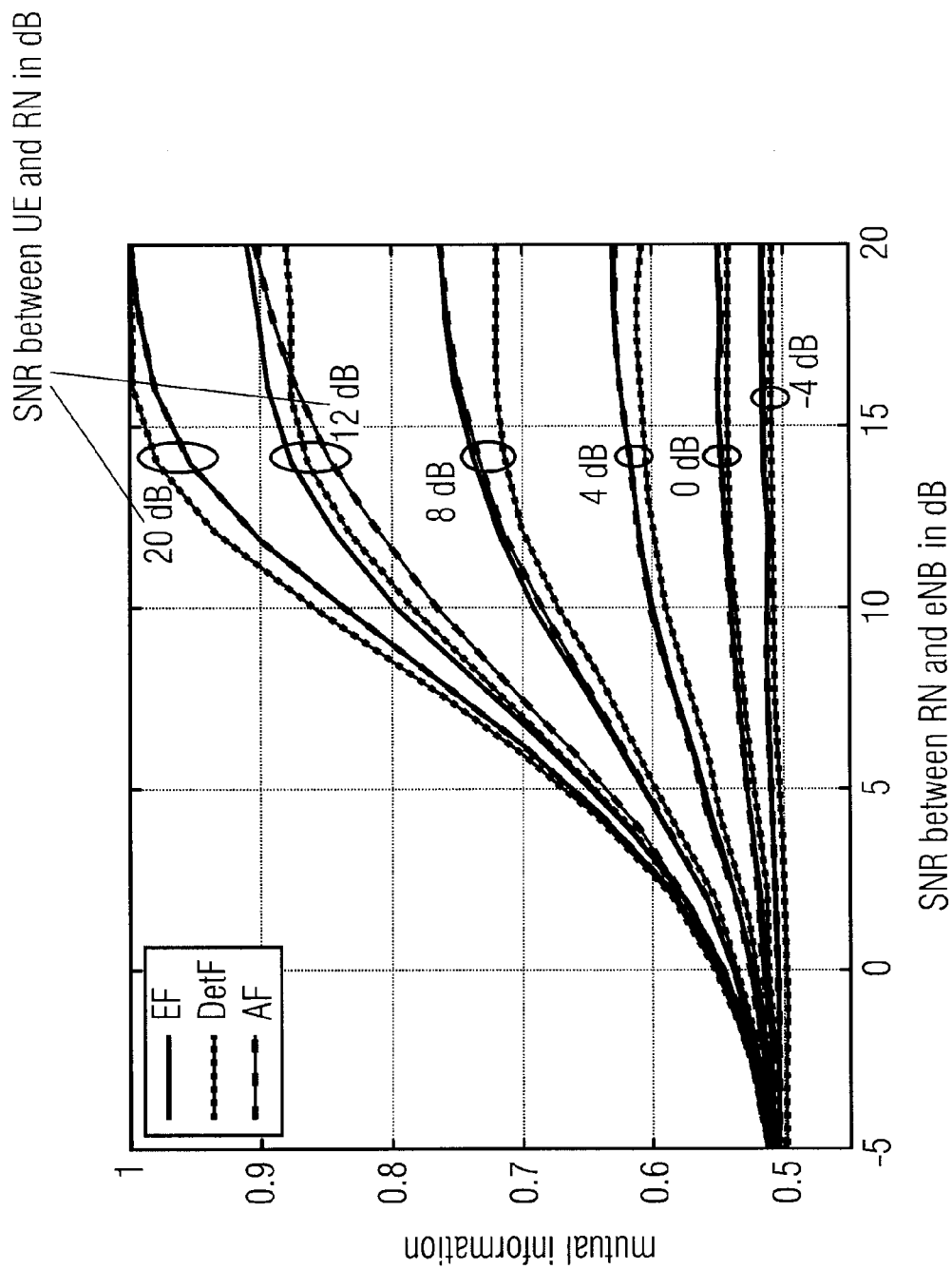
FIG. 12 is a diagram indicating the mutual information at the receiver.

In FIG. 11 the resulting mutual information is shown versus $SNR_{RD}$ for different values of $SNR_{SR}$ to illustrate the gain of EF for a large variety of conditions. It shows a diagram indicating a mutual information MI at the receiver for 16-QAM after maximum likelihood combining for different values of the signal to noise ratio of the channel between the transmitter and the relay station $SNR_{SR}$ and the signal to noise ratio of the channel between the relay station and the receiver $SNR_{RD}$ for a signal to noise ratio of the channel between the transmitter and the receiver $SNR_{SD}$=5 dB for uncoded transmission. The diagram shows the mutual information for estimate forward (EF), detect forward (DetF) and amplify forward (AF), all with ML-detection. A similar example is shown in FIG. 12, wherein the x-axis indicates the signal to noise ratio between the relay station (RN, relay node) and the transmitter (eNB, evolved node B) and the different shown characteristics are related to different signal to noise ratios between the receiver (UE, user equipment) and the relay station RN. The mutual information MI determines the maximum possible transmission rate. Higher mutual information enables higher throughput. FIG. 12 shows the mutual information at the receiver before channel decoding. The SNR on the direct connection is fixed to 5 dB, but similar results are obtained for different values. Here the same conclusions can be drawn as before. When the SNR on the first hop is large, the MI with AF is considerably less than for EF, whereas DetF shows significant loss for medium SNR on the first hop but large SNR on the second hop. In a coded system with strong codes such as turbo-codes this difference is quite significant as with proper rate matching the rate is increased at nearly no additional cost compared to DetF. The only things the destination has to know is the modulation scheme and the SNR of both hops. Furthermore, the detection complexity is comparable to that of DetF with ML-detection, so the gain comes at nearly no cost.

Figure 13:
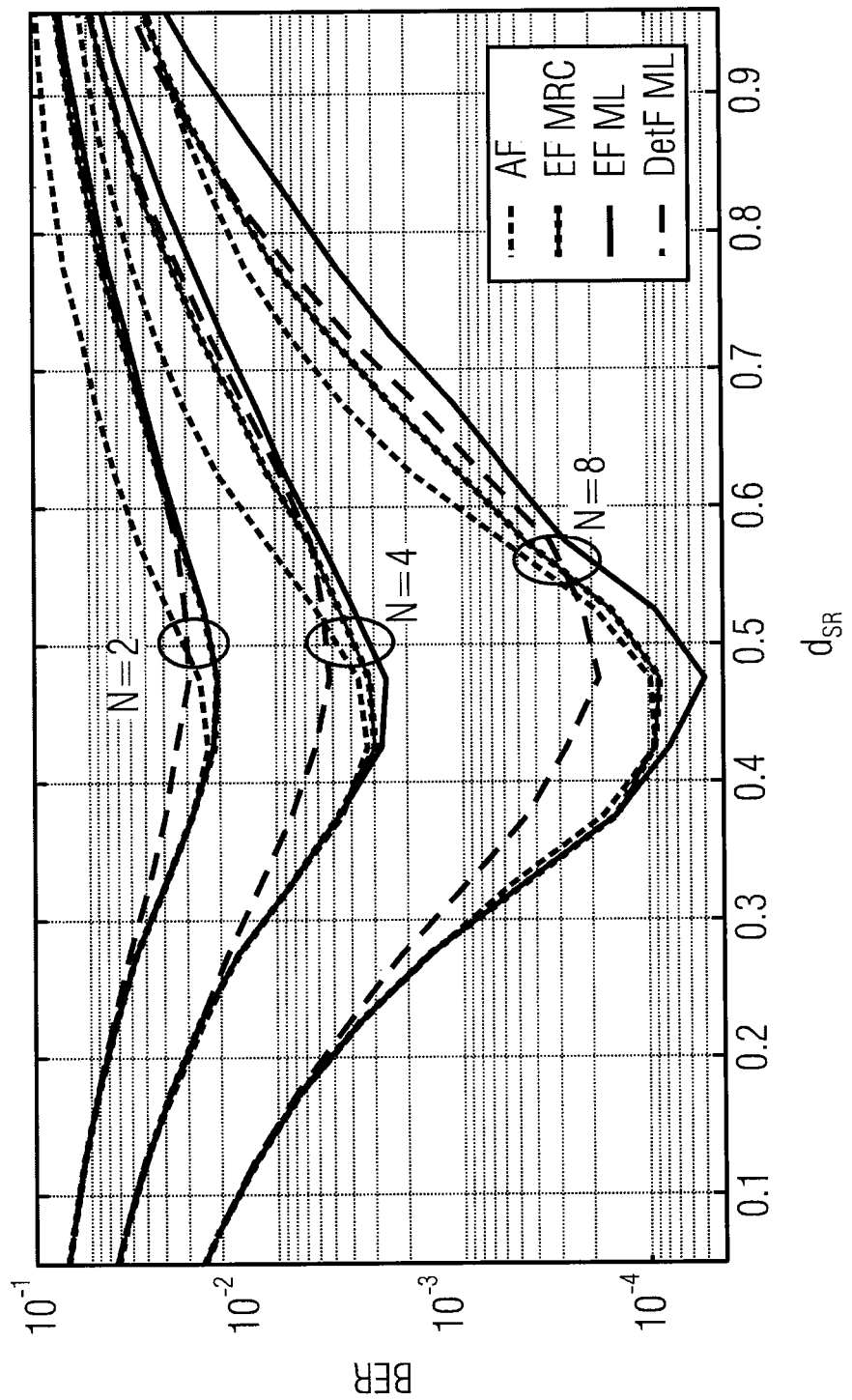
FIG. 13 is a diagram indicating an uncoded bit error rate for a different number of parallel relays for 16-QAM versus distance between source and relay.
Figure 14:
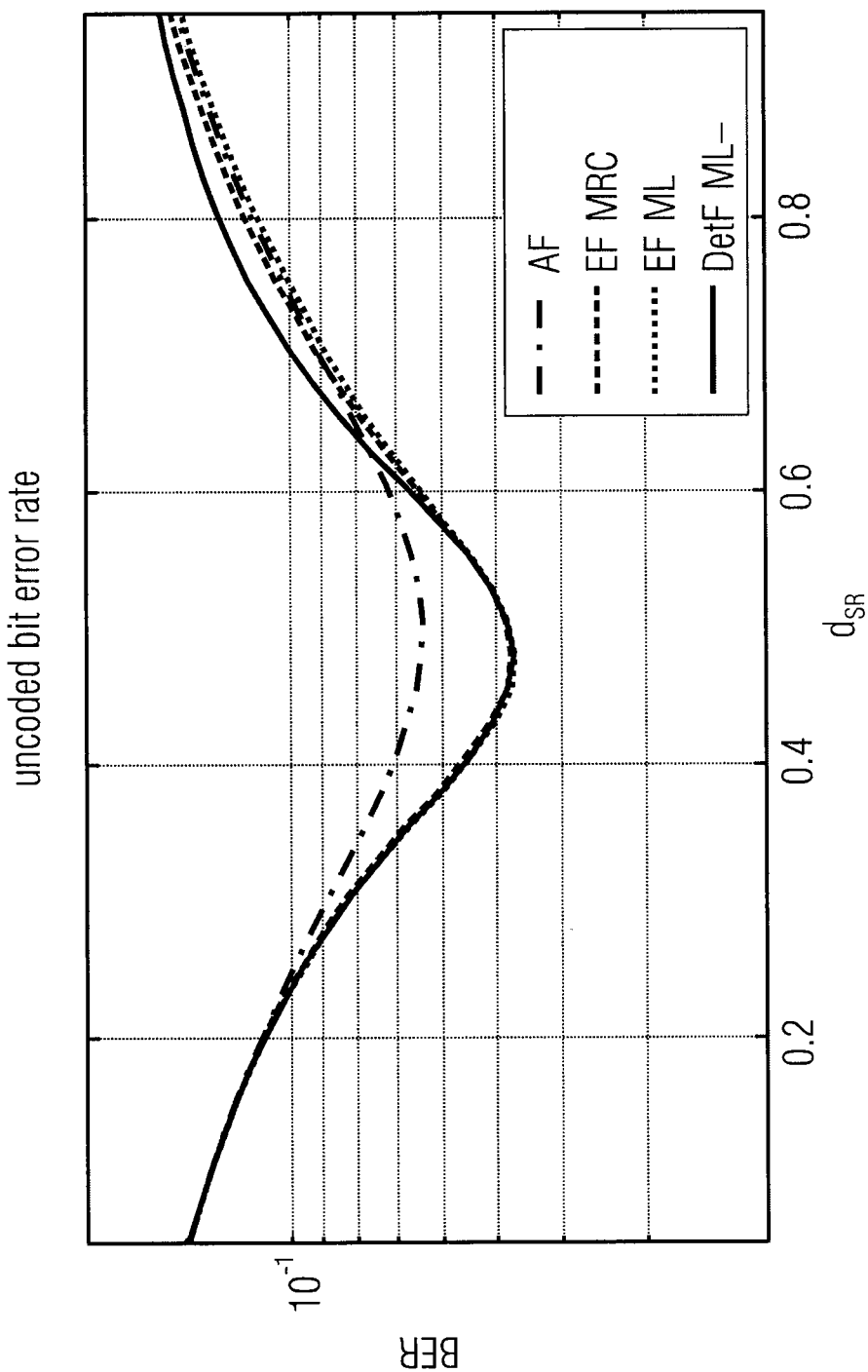
FIG. 14 is a diagram indicating an error rate without convolution code for 16-QAM versus distance between source and relay.
Figure 15:
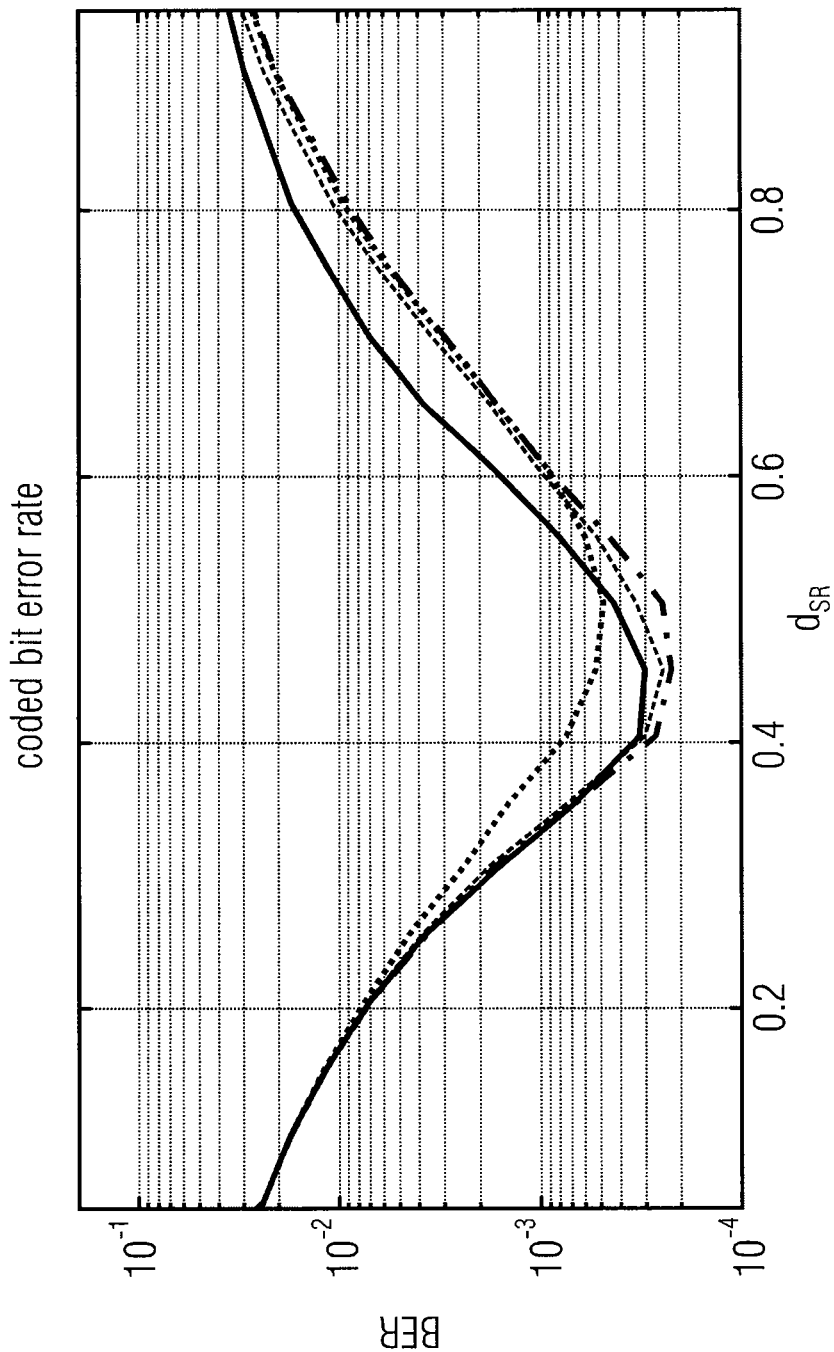
FIG. 15 is a diagram indicating an error rate with convolution code for 16-QAM versus distance between source and relay.

A different system setup is used in FIG. 13 to show the performance with several number of relays but without direct transmission. It shows a diagram indicating an uncoded bit error rate for a different number of parallel relays for 16-QAM versus distance between source (transmitter) and relay. The relay joins the line between source (transmitter) and destination (receiver) with $SNR_{SD}$=3 dB. The diagram indicates the uncoded bit error rate (BER) for amplify forward (AF), estimate forward with maximum ratio combining (EF MRC), estimate forward with maximum likelihood (EF ML) and detect forward with maximum likelihood (DetF ML). The BER is shown for 2, 4 and 8 relays transmitting on orthogonal resources now assuming a path loss exponent of 3. The loss of DetF gets obvious again but it can also be drawn from these results that the loss of AF is smaller than in FIG. 10. Here again the importance of availability of reliability information at the destination is the main reason. A direct comparison of the uncoded and the coded performance in a convolutionally coded system is shown in FIGS. 14 and 15. FIG. 14 shows a diagram indicating a bit error rate (BER) without convolution code (uncoded) for 16-QAM versus distance between source (transmitter) and relay. The relay joins the line between the transmitter and the receiver with $SNR_{SD}$=3 dB. Fittingly, FIG. 15 shows a bit error rate with convolution code for 16-QAM versus distance between source and relay. The relay joins the line between source and destination with $SNR_{SD}$=3 dB. The illustration of the respective lines is equal to the illustration in FIG. 14. In FIG. 14 the BER of the code bits without channel decoding at the destination is shown, whereas FIG. 15 shows the BER of the info bits after decoding the applied $[5\ 7]_8$ convolutional code. It can be observed that the advantage of EF becomes even more significant with channel coding especially in comparison to DetF with ML-detection. This is due to the fact that with channel coding the reliability information is even more important. As DetF wastes parts of this information due to the hard decision at the relay, the loss compared to EF is even worse in a coded system. Additionally, the gain of the ML-detector for EF gets larger with channel coding. The reason is that one specific L-value not only influences the decision on the corresponding code bit but due to the correlation introduced by the code it influences many information bits. This leads to a stronger impact of the correctness of each L-value, which is only ensured by the ML-detection.

Some embodiments according to the invention relate to a wireless communication system comprising a receiver according to the inventive concept. Further, the wireless communication system comprises a relay station, wherein a relay function used by the relay station is considered by the receiver in terms of the overall probability density function, which is based on a relay function. An example for such a wireless communication system is shown in FIG. 4.

This example illustrates a possible target configuration for an uplink, wherein an application to a downlink is straightforward. A user equipment (UE) performs a channel coding C and a modulation A for transmitting data d. The resulting signal $x_s$ sent to a relay station and optionally (if the eNB is in receive distance) to an evolved node B (eNB). The relay station or relay node (RN) performs an optional channel decoding and applies the relay function $f(y_{SR})$ to the receive signal to obtain a signal to be transmitted to the evolved node B. The evolved node B calculates a logarithmic likelihood ratio (or determines a logarithmic likelihood ratio from a lookup table) for the signal received from the relay station and optionally for a signal received from the user equipment. With this information a channel decoding $C^{-1}$ is performed to obtain the payload data d.

Figure 4:
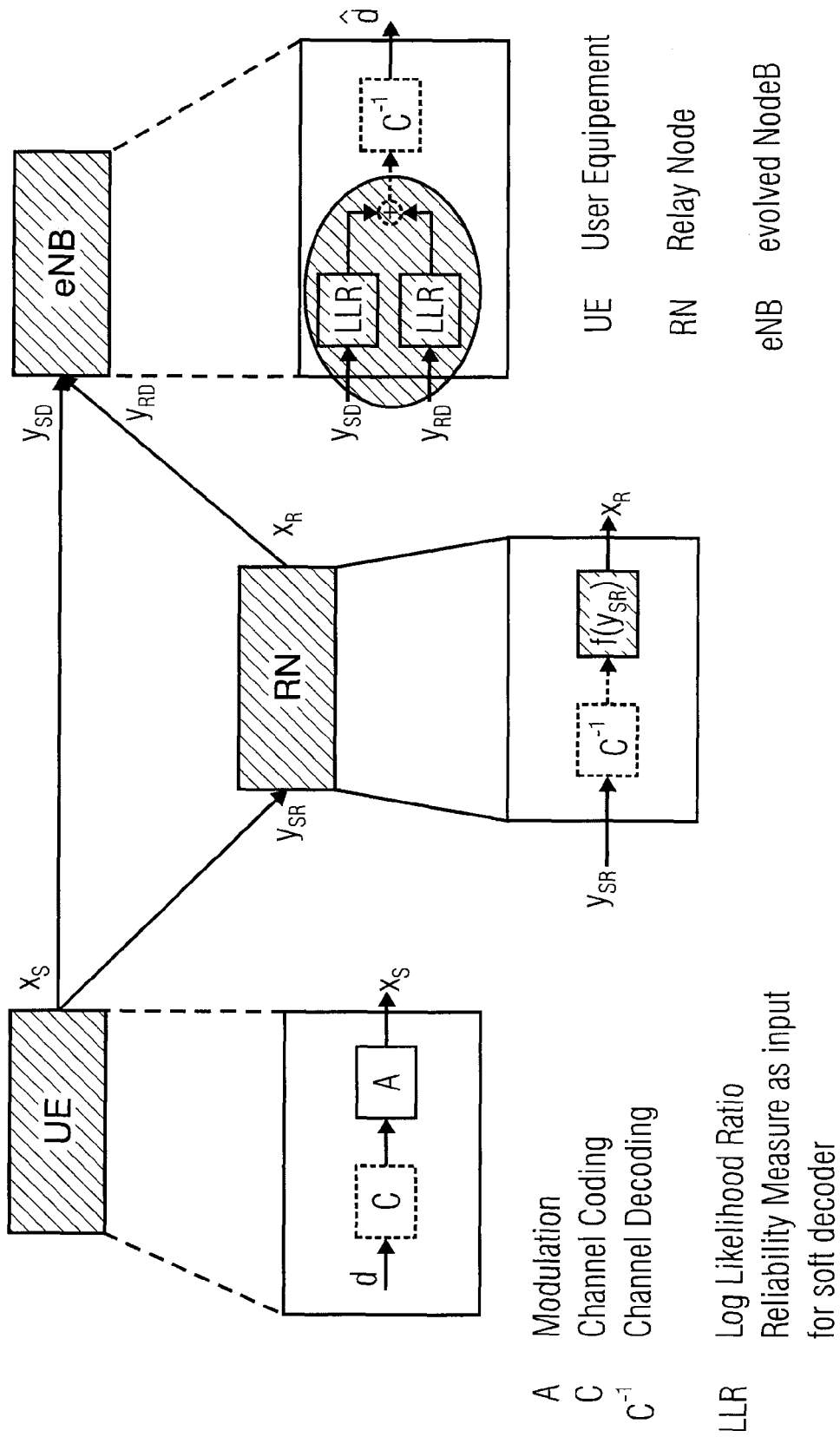
FIG. 4 shows a schematic illustration of a target configuration for uplink.

The configuration shown in FIG. 4 indicates a classical three terminal system with one source, one destination and one relay. The direct path may also be received by the destination, for example, separated by time division duplex (TDD) or frequency division duplex (FDD). A channel decoding may not be necessitated at the relay station, so that a simple (cheap) relay can be realized. Also different relay protocols (relay functions) as for example, amplify forward (AF), detect forward (DETF) and estimate forward (EF) may be used. Out of them, estimate forward may be an optimal function as it minimizes the means squared error at the receiver. The described concept may also be considered for standardization, for example, for beyond Rel. 10.

FIG. 4 also shows an example for a structure of a maximum likelihood (ML) receiver at the destination (evolved node B in this example). In the shown example, both received signals contain useful information, so that the signals should be combined properly. The summation of LLRs is optimal, if the observations about the information bits d are independent. In the case of dependent observations the overall pdf and a pdf depending on the receive signal from the transmitter may be combined before calculating the LLR, although alternatively the summation of LLRs may be used as an approximation to reduce the computational effort. The inventive concept may provide an optimal solution for estimate forward with higher order modulation schemes as for example used in LTE (long-term evolution).

The present invention provides, for example, a simple but closed form receiver functionality that enables maximum likelihood performance for a system with relays applying estimate forward with higher order modulation schemes. Additionally, if a soft input channel decoder (soft information decoder) is used at the receiver, exact logarithmic likelihood ratios can be computed. In this way, the possible gain of estimate forward may be preserved even for arbitrary modulation schemes. The proposed receiver may calculate an exact probability density function.

Figure 7:
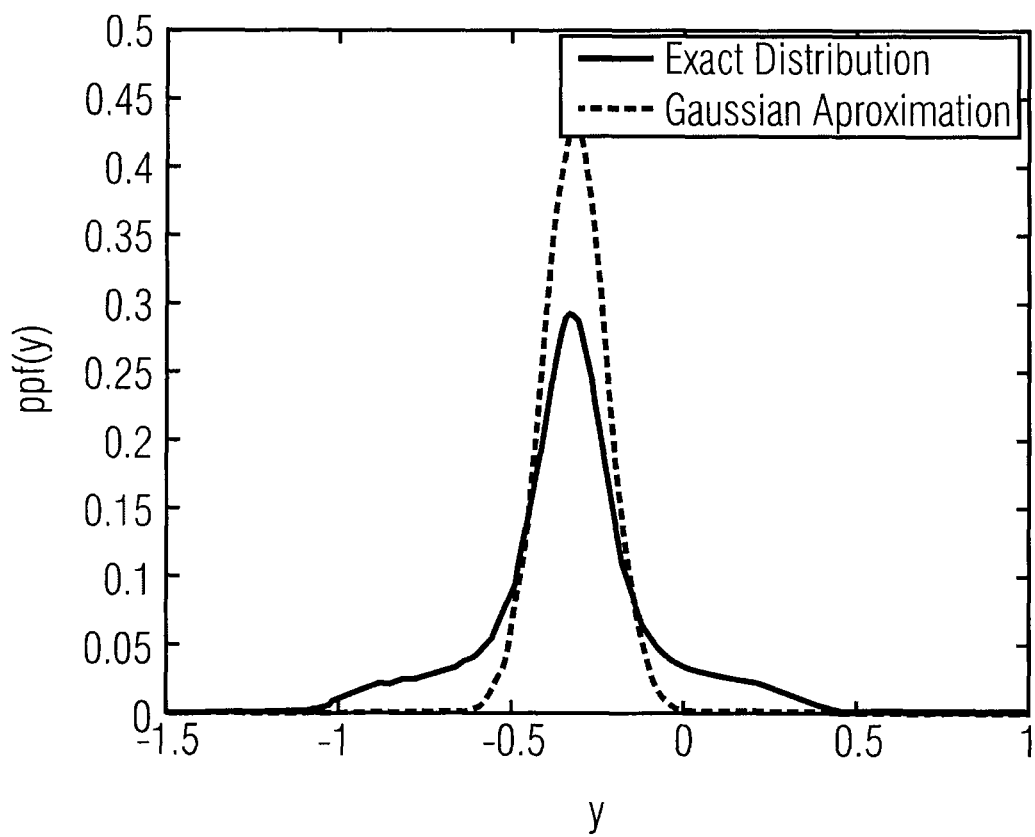
FIG. 7 is a schematic illustration of a comparison of probability density functions.

The exact probability density function (pdf) obtained with the proposed receivers significantly differs, for example, from a Gaussian approximation. This is illustrated, for example, in FIG. 7. The exact probability density function may be necessitated to enable a maximum likelihood receiver.

As shown for example in the before-mentioned FIG. 10, a receiver using the present invention may be the best in all shown cases. With the inventive approach, a lower bit error rate may be achievable as well as a higher user throughput and/or better user performance. Therefore, a receiver according to the described concept may also be a good candidate for beyond LTE Rel. 10.

Figure 5:
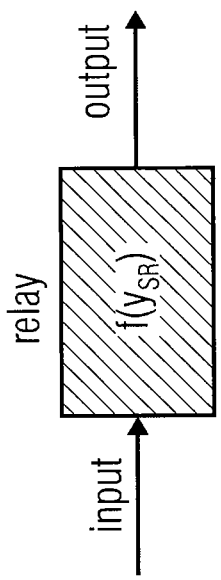
FIG. 5 is a schematic illustration of relay functions.
Figure 5:
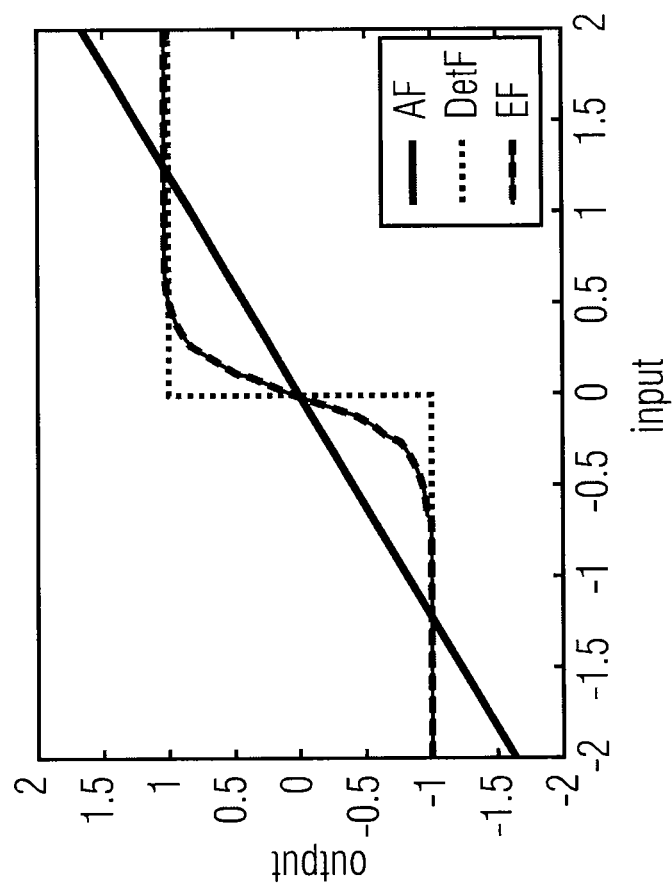

The relay station may be implemented in various ways. The implementation depends on mainly on the relay function. FIG. 5 shows a diagram comparing relay functions $f(y_{SR})$ for amplify forward AF, detect forward DETF and estimate forward EF. Amplify forward just normalizes received signals and is a linear function. Detect forward makes a hard decision, so that some information is lost. Estimate forward combines both and is nearly linear at low reliability, and nearly hard decision at high reliability.

Some embodiments according to the invention relate to a maximum likelihood receiver for minimum means squared error relaying. A Maximum Likelihood (ML) receiver for Estimate-Forward relaying that minimizes the Mean Squared Error was described for arbitrary modulation alphabets. This enables ML performance even in the case of more than one signal path received at the destination. In contrast to that, known solutions use a Gaussian approximation leading to significant loss in terms of coded and uncoded Bit Error Rate as well as Mutual Information. Additionally, a simple algorithm to calculate the necessitated Log-Likelihood Ratios is presented showing the efficient realization of the general ML condition for the applied Estimate-Forward. The presented concept is applicable for wireless communication systems using simple and cheap relays with small delay without complex decoding or encoding. With the presented receiver EF shows significant performance gains in comparison to AF and DetF and is therefore a very promising approach for future mobile communication systems.

If more than one relay is considered or if the signal received directly from the source contains useful information, these signals should be combined properly. In the case of nonlinear functions at the relay like for DF or EF, the disturbance of the signal received from the relay is not Gaussian any more and simple weighted linear combining like Maximum Ratio Combining is suboptimal. As described a Maximum Likelihood detection for EF with higher order modulation schemes is derived. This receiver results in significant gains in terms of bit error rate and mutual information and therefore leads to a higher user throughput compared to known techniques. Moreover, these gains are obtained without increasing the computational complexity of the terminals significantly.

Figure 16:
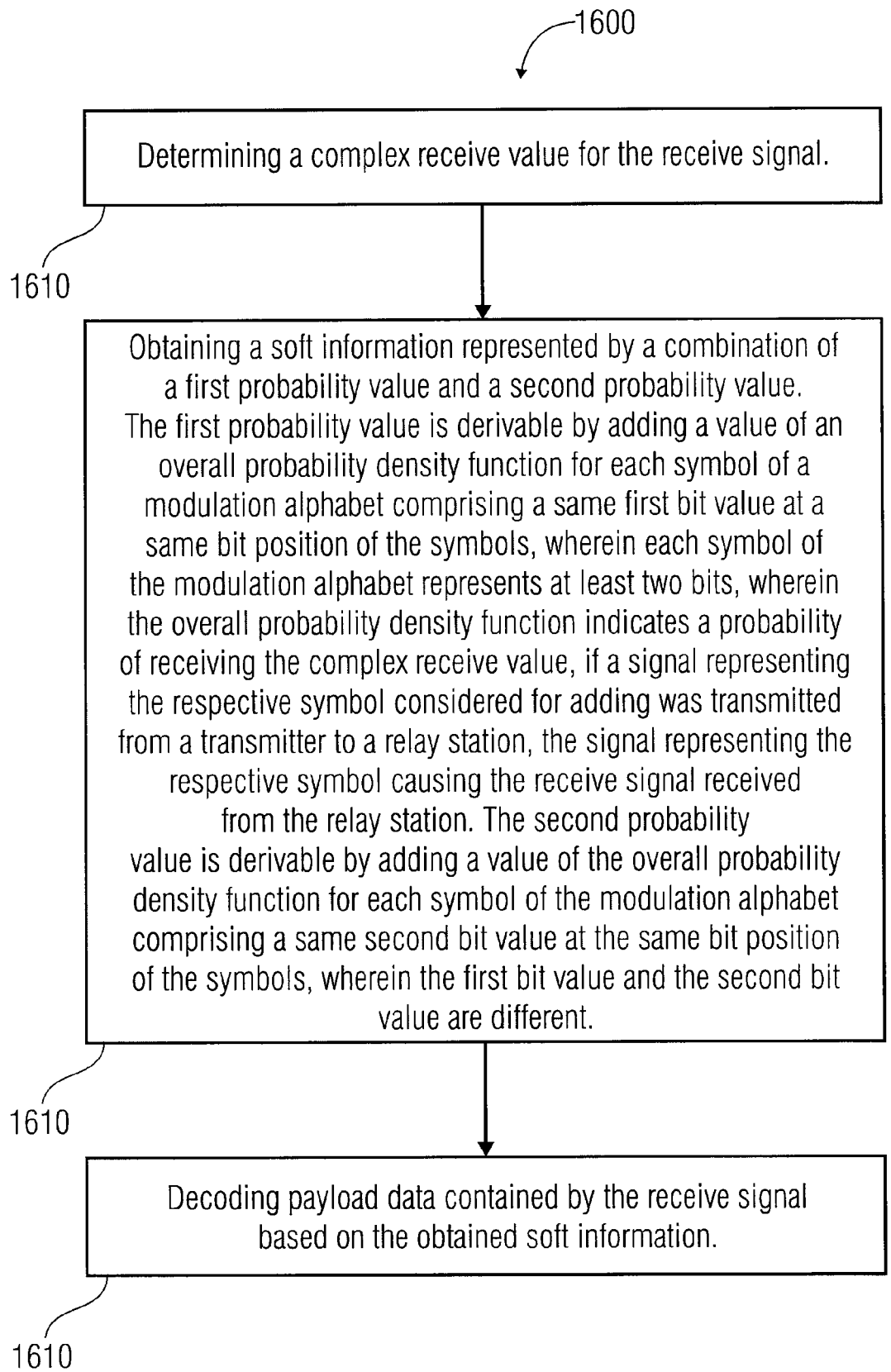
FIG. 16 is a flowchart of a method for decoding a receive signal in a wireless communication system.

FIG. 16 shows a flowchart of a method 1600 for decoding a receive signal in a wireless communication system according to an embodiment of the invention. The method 1600 comprises determining 1610 a complex receive value for the receive signal, obtaining 1620 a soft information and decoding 1630 payload data contained by the receive signal based on the obtained soft information. The soft information represents a combination of a first probability value and a second probability value. The first probability value is derivable by adding a value depending on an overall probability density function for each symbol of a modulation alphabet comprising a same first bit value at a same bit position of the symbols, wherein each symbol of the modulation alphabet represents at least two bits. Further, the overall probability density function indicates a probability of receiving the complex receive value, if a signal representing the respective symbol considered for adding was transmitted from a transmitter to a relay station, wherein the signal representing the respective symbol causing the receive signal received from the relay station. The second probability value is derivable by adding a value depending on the overall probability density function for each symbol of the modulation alphabet comprising a same second bit value at the same bit position of the symbols. The first bit value and the second bit value are different.

The method 1600 may comprise additional, optional steps representing additional features of the inventive concept described above.

Some embodiments according to the invention relate to a method combining signals from a source and at least one relay node for a system where the source transmits arbitrary higher order modulation schemes (e.g. 16-QAM) and at least one node is a relay node applying a mean squared error minimizing function called estimate forward and where the exact probability density function is used in order to apply a maximum likelihood receiver. Further, the signals may be received from two or more relay nodes where at least one applies estimate forward. Optionally, at least one relay decodes the received message with a soft output decoder and calculates the mean squared error minimizing function jointly based on channel observation and channel decoder output. Further, a piecewise linear approximation of the maximum likelihood receiver may be applied.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A receiver for decoding a receive signal in a wireless communication system, comprising:
 a signal determiner configured to determine a complex receive value for the receive signal;
 a soft information determiner configured to acquire a soft information represented by a combination of a first probability value and a second probability value,
 wherein the first probability value is derivable by adding a value depending on an overall probability density function for each symbol of a modulation alphabet comprising a same first bit value at a same bit position of the symbols, wherein each symbol of the modulation alphabet represents at least two bits, wherein the overall probability density function indicates a probability of receiving the complex receive value, if a signal representing the respective symbol considered for adding was transmitted from a transmitter to a relay station, wherein the signal representing the respective symbol is caused by the receive signal received from the relay station,
 wherein the second probability value is derivable by adding a value depending on the overall probability density function for each symbol of the modulation alphabet comprising a same second bit value at the same bit position of the symbols, wherein the first bit value and the second bit value are different;
 a soft information decoder configured to decode payload data comprised by the receive signal based on the acquired soft information.

2. A receiver according to claim 1, comprising a storage unit configured to store a lookup table comprising a plurality of soft information for a plurality of predefined complex receive values, wherein the soft information determiner is configured to determine the soft information for decoding based on the plurality of soft information comprised by the lookup table in dependency on the determined complex receive value.

3. A receiver according to claim 1, wherein the soft information determiner is configured to calculate the first probability value by adding a value depending on the overall probability density function for each symbol of the modulation alphabet comprising the same first bit value at the same bit position of the symbols,
 wherein the soft information determiner is configured to calculate the second probability value by adding a value depending on the overall probability density function for each symbol of the modulation alphabet comprising the same second bit value at the same bit position of the symbols,
 and wherein the soft information determiner is configured to combine the first probability value and the second probability value to acquire the soft information.

4. A receiver according to claim 1, wherein the soft information represents the logarithm of the first probability value divided by the second probability value, so that the soft information represents a logarithmic likelihood ratio.

5. A receiver according to claim 1, wherein each symbol of the modulation alphabet represents more than two bits.

6. A receiver according to claim 1, wherein the overall probability density function is based on a relay function known by the receiver, wherein the relay function is used by the relay station to determine a radio signal to be transmitted to the receiver based on a radio signal received from the transmitter.

7. A receiver according to claim 6, wherein the relay function is based on $$f(y_{SR}) \propto E\{s \mid y_{SR}\} = \sum_{s \in A} s p(s \mid y_{SR})$$

or $$f(y_{SR}) = \beta E(s \mid y_{SR}, C) = \beta \sum_{s} s \cdot p(s \mid y_{SR}, C)$$

or $$f(y_{SR}) = \hat{s} = \max_{s \in A} p(s \mid y_{SR})$$

or $$f(y_{SR}) = \beta_{AF} \cdot y_{SR}$$

wherein s indicates a symbol of the modulation alphabet A, $y_{SR}$ indicates a complex receive value received by the relay station from the transmitter, $f(y_{SR})$ indicates the relay function, C indicates a channel code and $\beta_{AF}$ indicates a scaling factor.

8. A receiver according to claim 6, comprising a storage unit configured to store a scaling factor and to provide the scaling factor to the soft information determiner for determining the soft information, wherein the soft information determiner is configured to determine a new scaling factor and configured to update the stored scaling factor by the new scaling factor, if a noise information comprised by the receive signal, indicating a noise level of a channel between the transmitter and the relay station, changes more than a predefined threshold.

9. A receiver according to claim 1, wherein the signal determiner is configured to determine or extract a first noise information from the receive signal indicating a noise level of a channel between the relay station and the receiver and configured to extract a second noise information comprised by the receive signal indicating a noise level of a channel between the transmitter and the relay station, wherein the overall probability density function depends on the first noise information and on the second noise information.

10. A receiver according to claim 1, wherein the soft information determiner is configured to acquire a logarithmic likelihood ratio based on a receive signal received from the transmitter, wherein the soft information represents a logarithmic likelihood ratio with the logarithm of the first probability value divided by the second probability value, wherein the first probability value and the second probability value depend on a product of the overall probability density function and a probability density function depending on a receive signal received from the transmitter, wherein the receive signal received from the transmitter comprises the same payload data as the receive signal received from the relay station.

11. A receiver according to claim 1, wherein a radio signal transmitted by the relay station is received via a first channel and a radio signal transmitted from the transmitter is received via a second channel, wherein the first channel is independent from the second channel.

12. A receiver according to claim 5, wherein the overall probability density function is based on a first probability density function indicating a probability of receiving the complex receive value, if the relay station transmits a radio signal comprising a complex transmit value determined by the relay function, and wherein the overall probability density function is based on a second probability density function indicating a probability of receiving a receive signal with a complex receive value from the transmitter at the relay station, if the respective symbol considered for adding was transmitted to the relay station by the transmitter.

13. A receiver according to claim 1, wherein the soft information determiner is configured to determine the soft information based on $$L_{SRD} = \ln \left( \frac{\sum_{s \in A_v^0} \int_{-\infty}^{\infty} e^{-\frac{|y_{RD}-f(y_{SR})|^2}{2\sigma_D^2}} \cdot e^{-\frac{|y_{SR}-s|^2}{2\sigma_R^2}} dy_{SR}}{\sum_{s \in A_v^1} \int_{-\infty}^{\infty} e^{-\frac{|y_{RD}-f(y_{SR})|^2}{2\sigma_D^2}} \cdot e^{-\frac{|y_{SR}-s|^2}{2\sigma_R^2}} dy_{SR}} \right)$$

$$= \ln \left( \frac{\sum_{s \in A_v^0} \int_{-\infty}^{\infty} e^{\frac{-\sigma_R^2|y_{RD}-\beta\sum_{s' \in A} s' p(s'|y_{SR})|^2 - \sigma_D^2|y_{SR}-s|^2}{2\sigma_D^2 \sigma_R^2}} dy_{SR}}{\sum_{s \in A_v^1} \int_{-\infty}^{\infty} e^{\frac{-\sigma_R^2|y_{RD}-\beta\sum_{s' \in A} s' p(s'|y_{SR})|^2 - \sigma_D^2|y_{SR}-s|^2}{2\sigma_D^2 \sigma_R^2}} dy_{SR}} \right)$$

or $$L(d) = \ln \left( \frac{\sum_{s \in A_v^0} \int_{-\infty}^{\infty} e^{-\frac{|y_{RD}-f(y_{SR})|^2}{2\sigma_D^2}} \cdot e^{-\frac{|y_{SR}-s|^2}{2\sigma_R^2}} dy_{SR} \cdot e^{-\frac{|y_{SD}-s|^2}{2\sigma_D^2}}}{\sum_{s \in A_v^1} \int_{-\infty}^{\infty} e^{-\frac{|y_{RD}-f(y_{SR})|^2}{2\sigma_D^2}} \cdot e^{-\frac{|y_{SR}-s|^2}{2\sigma_R^2}} dy_{SR} \cdot e^{-\frac{|y_{SD}-s|^2}{2\sigma_D^2}}} \right) =$$

-continued $$\ln \left( \frac{\sum_{s \in A_v^0} \int_{-\infty}^{\infty} e^{\frac{-\sigma_R^2|y_{RD}-\beta\sum_{s' \in A} s' p(s'|y_{SR})|^2 - \sigma_D^2|y_{SR}-s|^2}{2\sigma_D^2 \sigma_R^2}} dy_{SR} \cdot e^{-\frac{|y_{SD}-s|^2}{2\sigma_D^2}}}{\sum_{s \in A_v^1} \int_{-\infty}^{\infty} e^{\frac{-\sigma_R^2|y_{RD}-\beta\sum_{s' \in A} s' p(s'|y_{SR})|^2 - \sigma_D^2|y_{SR}-s|^2}{2\sigma_D^2 \sigma_R^2}} dy_{SR} \cdot e^{-\frac{|y_{SD}-s|^2}{2\sigma_D^2}}} \right)$$

wherein $L_{SRD}$ indicates a logarithmic likelihood ratio of a bit of a receive signal received from the relay station caused by a signal from the transmitter, s indicates a symbol of the modulation alphabet A, $A_v^d$ represents the set of modulation symbols mapped to bit tuples with $d \in (0,1)$ at the v-th position of a symbol, $y_{RD}$ indicates the determined complex receive value, $y_{SR}$ indicates a complex receive value determined by the relay station from a receive signal received from the transmitter, $f(y_{SR})$ indicates the relay function, $\sigma_D^2$ indicates the noise variance of the channel between the relay station and the receiver, $\sigma_R^2$ indicates the variance of the channel between the transmitter and the relay station and $\beta$ indicates a scaling factor of the relay function; L(d) indicates a logarithmic likelihood ratio of a bit of a receive signal received from the relay station caused by a signal from the transmitter and the receive signal received from the transmitter.

14. A method for decoding a receive signal in a wireless communication system, comprising:
determining a complex receive value for the receive signal;
acquiring a soft information represented by a combination of a first probability value and a second probability value,
wherein the first probability value is derivable by adding a value depending on an overall probability density function for each symbol of a modulation alphabet comprising a same first bit value at a same bit position of the symbols, wherein each symbol of the modulation alphabet represents at least two bits, wherein the overall probability density function indicates a probability of receiving the complex receive value, if a signal representing the respective symbol considered for adding was transmitted from a transmitter to a relay station, wherein the signal representing the respective symbol is caused by the receive signal received from the relay station,
wherein the second probability value is derivable by adding a value depending on the overall probability density function for each symbol of the modulation alphabet comprising a same second bit value at the same bit position of the symbols, wherein the first bit value and the second bit value are different; and
decoding payload data comprised by the receive signal based on the acquired soft information.

15. A non-transitory storage medium having stored thereon a computer program with a program code for performing the method for decoding a receive signal in a wireless communication system, the method comprising:
determining a complex receive value for the receive signal;
acquiring a soft information represented by a combination of a first probability value and a second probability value,
wherein the first probability value is derivable by adding a value depending on an overall probability density function for each symbol of a modulation alphabet comprising a same first bit value at a same bit position of the symbols, wherein each symbol of the modulation alphabet represents at least two bits, wherein the overall probability density function indicates a probability of receiving the complex receive value, if a signal representing the respective symbol considered for adding was transmitted from a transmitter to a relay station, wherein the signal representing the respective symbol is caused by the receive signal received from the relay station, wherein the second probability value is derivable by adding a value depending on the overall probability density function for each symbol of the modulation alphabet comprising a same second bit value at the same bit position of the symbols, wherein the first bit value and the second bit value are different; and decoding payload data comprised by the receive signal based on the acquired soft information, when the computer program runs on a computer or a microcontroller.

* * * * *